United States Patent
Xu et al.

(10) Patent No.: US 12,458,602 B2
(45) Date of Patent: Nov. 4, 2025

(54) REALIZING THE NANO-AMORPHOUS STATE OF MATERIALS INSIDE NANO-POROUS TEMPLATES

(71) Applicants: The Chinese University of Hong Kong, Hong Kong (CN); President and Fellows of Harvard College, Cambridge, MA (US)

(72) Inventors: Lei Xu, Hong Kong (CN); David Weitz, Bolton, MA (US); Zhuo Xu, Guangzhou (CN); Changliang Zhu, Yantai (CN)

(73) Assignees: The Chinese University of Hong Kong, Hong Kong (CN); President and Fellows of Harvard College, Cambridge, MA (US)

( * ) Notice: Subject to any disclaimer, the term of this patent is extended or adjusted under 35 U.S.C. 154(b) by 398 days.

(21) Appl. No.: 17/313,528

(22) Filed: May 6, 2021

(65) Prior Publication Data
US 2022/0354796 A1   Nov. 10, 2022

(51) Int. Cl.
*A61K 9/20* (2006.01)
*A61K 45/06* (2006.01)

(52) U.S. Cl.
CPC .......... *A61K 9/2095* (2013.01); *A61K 9/2009* (2013.01); *A61K 9/2027* (2013.01); *A61K 9/2031* (2013.01); *A61K 9/2072* (2013.01); *A61K 45/06* (2013.01)

(58) Field of Classification Search
None
See application file for complete search history.

(56) References Cited

U.S. PATENT DOCUMENTS

| | | | |
|---|---|---|---|
| 6,790,528 B2 | 9/2004 | Wendorff et al. | |
| 8,258,137 B2* | 9/2012 | Augustijns | A61K 47/32 424/401 |
| 8,778,401 B2 | 7/2014 | Shen et al. | |
| 8,815,273 B2 | 8/2014 | Atanasoska et al. | |
| 2002/0034827 A1 | 3/2002 | Singh et al. | |
| 2005/0106310 A1* | 5/2005 | Green | B01J 2/10 426/650 |
| 2008/0095852 A1* | 4/2008 | Kong | A61K 51/1244 977/773 |
| 2009/0118821 A1 | 5/2009 | Scheuermann et al. | |
| 2011/0177231 A1 | 7/2011 | Grinberg | |
| 2011/0244002 A1* | 10/2011 | Shen | A61K 9/143 514/543 |
| 2016/0263123 A1* | 9/2016 | Prinderre | A61K 9/143 |
| 2019/0127232 A1 | 5/2019 | Cheung et al. | |

FOREIGN PATENT DOCUMENTS

KR     101230337 B1 *  4/2011

OTHER PUBLICATIONS

Mellaerts, Langmuir, 24, 2008 (Year: 2008).*
International Search Report dated Jan. 11, 2023 in International Application No. PCT/US22/27873.
Bertei, A. et al., "Effective Transport Properties in Random Packings of Spheres and Agglomerates", Chemical Engineering Transactions, 2013, 32:1531-1536, AIDIC Servizi S.r.l.
Kresge, C.T. et al., "Ordered mesoporous molecular sieves synthesized by a liquid-crystal template mechanism", Nature, Oct. 22, 1992, 359:710-712, Nature Publishing Group.
Hinds, B.J. et al., "Aligned Multiwalled Carbon Nanotube Membranes", Science, Jan. 2, 2004, 303(5654):62-65.
Danks, A.E. et al., "The evolution of 'sol-gel' chemistry as a technique for materials synthesis", Materials Horizon, 2016, 3:91-112, The Royal Society of Chemistry.
Rahman, I.A. et al., "Effect of the drying techniques on the morphology of silica nanoparticles synthesized via sol-gel process", Ceramics International, 2008, 34:2059-2066, Elsevier Ltd and Techna Group S.r.l.
Laurie, J. et al., "Colloidal suspensions for the preparation of ceramics by a freeze casting route", Journal of Non-Crystalline Solids, 1992, 147&148:320-325, Elsevier Science Publishers B.V.
Washburn, E.W., "The Dynamics of Capillary Flow", The Physical Review, Mar. 1921, vol. XVII, No. 3, pp. 273-283.

* cited by examiner

Primary Examiner — Robert A Wax
Assistant Examiner — William Craigo
(74) Attorney, Agent, or Firm — SALIWANCHIK, LLOYD & EISENSCHENK

(57) ABSTRACT

The subject invention pertains to methods to produce amorphous materials at nanometer scale, by solidifying or hardening the materials inside nanometer-sized pores of porous media (i.e., porous templates). The porous templates can be made by packing nanometer-sized particles or other means. The subject invention further pertains to methods to produce the porous templates used to produce amorphous material at nanometer scale.

9 Claims, 29 Drawing Sheets

22nm particles 12 nm particles 7 nm particles pH = 10 pH = 8 pH = 4

Fast Evaporation under Vacuum

Slow Evaporation in Open-air

REALIZING THE NANO-AMORPHOUS STATE OF MATERIALS INSIDE NANO-POROUS TEMPLATES

BACKGROUND OF THE INVENTION

An important issue in drug industry is the poor water solubility of hydrophobic drugs or drug candidates that limits the ingredients' utilization and absorption in human bodies. Besides the issue of poor water solubility, there are also problems caused by poor oil solubility in pharmaceutical, catalysts and other industries.

Accordingly, a method that aims to dissolve both hydrophobic materials in water and oleophobic ingredients in oil is needed and may find wide applications in many different fields.

BRIEF SUMMARY OF THE INVENTION

The disclosure provides methods to produce amorphous materials at nanometer scale, by solidifying or hardening the materials inside nanometer-sized pores of porous media (i.e., porous templates). The porous templates can be made by packing nanometer-sized particles or other means. Due to the spatial constraint of nanometer-sized pores, the solidification inside cannot reach the crystallization condition, and thus leads to an amorphous state at nanometer scale. This nano-amorphous state has many surprising properties, including but not limited to: dissolving compounds more easily with a higher concentration and a faster dissolution rate than the crystalline counterpart in various solvents, having higher free energy than crystalline counterparts, possessing a large specific surface area and surface energy, remaining stable over a long period of time, and exhibiting distinct mechanical or transport properties due to its non-crystalline and nanometer-sized structure.

The subject method can be applied to insoluble pharmaceutical materials to produce nano-amorphous drugs with significantly improved bioavailability. The aqueous concentrations can increase many times compared with the crystalline counterparts, and the dissolution rates are also greatly increased. By fine-tuning the template properties and solidification process, the solubility and the dissolution rate may also be broadly adjusted.

Besides aqueous solutions, the subject method can also work for organic solvents and, thus, is suitable for both oral drugs and external ointment medications. The subject method is a physical approach, which does not modify the chemical components of the materials; therefore, it can be generally applied to different materials including, but not limited to, pharmaceutical materials.

In certain embodiments, the nano-amorphous materials produced by this method may only contain the active ingredient and the porous template, without any other materials such as, for example, solubility-promoting cosolvents or surface active agents often found in typical pharmaceutical products. Therefore, the components used in the subject method can inhibit undesirable effects that can be attributed to additional components. The subject method can avoid the complex encapsulation process, such as, for example, softgel capsulation required by liquid cosolvents, which may significantly reduce the manufacturing cost.

In certain embodiments, the nano-porous templates can stabilize the nano-amorphous materials over a long time interval. In certain embodiments, the compounds cannot recrystallize nor have any other change in properties from several months to more than one year. Therefore, it has a long storage shelf life.

In certain embodiments, the method can also be used to make amorphous materials other than drugs. It can vitrify other materials inside nano-porous templates, to produce nano-amorphous matter. Our approach can avoid the fast-temperature-quenching approach typically required for producing amorphous materials, and opens up a new direction to make amorphous materials at nanometer scale.

DETAILED DISCLOSURE OF THE INVENTION

Figure 1A:
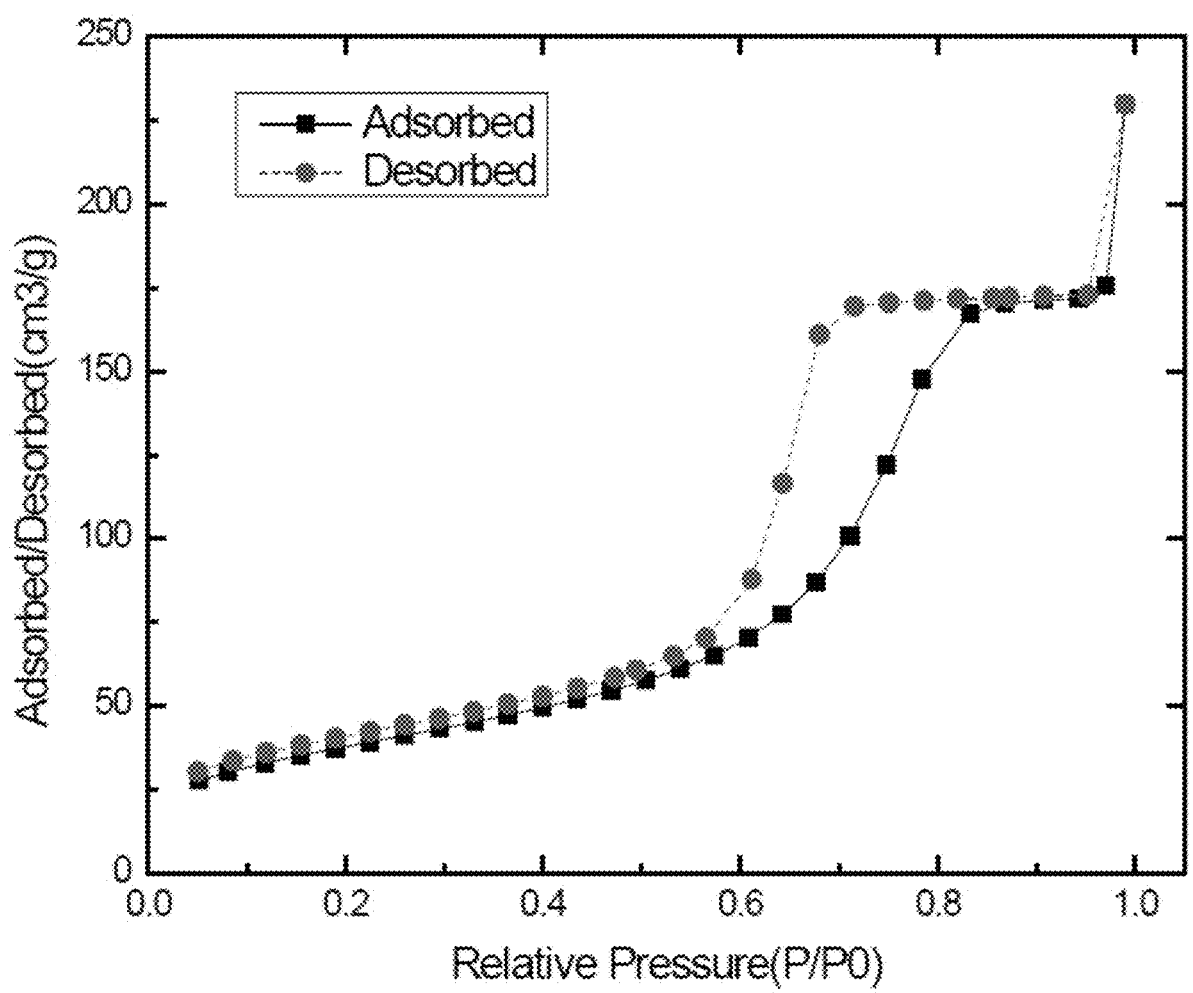
FIGS. 1A-1B show the Brunauer-Emmett-Teller (BET) sorption isotherm of one porous template made from 22 nm particles, and the pore volume distribution derived from the BET sorption isotherm.

The subject invention concerns the production of composites to achieve a nano-amorphous state of an active compound, which can increase the active compound performance by altering properties such as solubility, dissolution rate, and mechanical properties. In certain embodiments, the method typically comprises combining two parts: (1) active ingredients in the nano-amorphous state, which can have advantageous properties due to their amorphous state, nanoscale size, large surface area, and controllable solvent preference; (2) porous templates, which physically confine the active ingredients in their pores. Templates play an important role in increasing the ingredients' free energy, keeping ingredients stable, controlling the disintegration, and suppressing the recrystallization.

Definitions

Ranges provided herein are understood to be shorthand for all of the values within the range. For example, a range of 1 to 20 is understood to include any number, combination of numbers, or sub-range from the group consisting 1, 2, 3, 4, 5, 6, 7, 8, 9, 10, 11, 12, 13, 14, 15, 16, 17, 18, 19 and 20, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

As used herein a "reduction" means a negative alteration, and an "increase" means a positive alteration, wherein the negative or positive alteration is at least 0.001%, 0.01%, 0.1%, 0.5%, 1%, 5%, 10%, 15%, 20%, 25%, 30%, 35%, 40%, 45%, 50%, 55%, 60%, 65%, 70%, 75%, 80%, 85%, 90%, 95% or 100%.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Unless specifically stated or obvious from context, as used herein, the term "or" is understood to be inclusive. Unless specifically stated or obvious from context, as used herein, the terms "a," "and" and "the" are understood to be singular or plural.

Unless specifically stated or obvious from context, as used herein, the term "about" is understood as within a range of normal tolerance in the art, for example within 2 standard deviations of the mean. About can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term about.

As used herein, the term "porosity" or "p" is a measure of the void spaces in a material, defined as the fraction of the volume of voids over the total volume. It has a value between 0 and 1, or as a percentage between 0% and 100%.

As used herein, the term "mean pore diameter" or "$D_p$" is the mean pore size of the porous material and "mean particle diameter" or "$D_e$" are the mean size of the individual particles that are the basic packing elements. The terms "normalized mean pore diameter" or "$ND_p$"

$$\left(ND_p = \frac{D_p}{D_e}\right)$$

is the ratio between the mean pore diameter to the mean particle diameter.

As used herein, the term "permeability" or "κ" is the ability of fluids to flow through porous material. According to Kozeny-Carman equation, $$\kappa = a \frac{\varphi^3 D_p^2}{(1-\varphi)^2},$$

with a the proportionality factor.

As used herein, the term "specific surface area" or "SSA" is the total surface area per unit volume of material.

Active Compounds

According to the methods described herein, the active compound that can be used in the subject methods can be any compound stable above its melting temperature in an inert atmosphere, or any solid state compound below its melting temperature.

In certain embodiments, once the compounds are at the melting temperature or greater temperature, the compounds can then infiltrate into the pores of the porous templates. If oxidization or a reaction with the surrounding atmosphere occurs, protective gases, such as pure nitrogen or argon, may be supplied to insulate the active compound from oxygen or any other reactive component. Additionally, the melting point can be lowered using means such as, for example, adding a modifier and/or applying high pressure.

In certain embodiments, the active compound can be in the solid state below the melting temperature. Due to the small pore size that produces strong surface effect, even the solid-state active compound can infiltrate into the pore space and turns into the nano-amorphous state. The external stress applied by pressing may also help the compound to infiltrate into pores.

In certain embodiments, the active compound can be soluble in certain preferred solvents. In certain embodiments, the active compound can be dissolved in a solvent first, particularly compounds that degrade at high temperatures, and then the dissolved compound can subsequently infiltrate the pores in the porous templates. The preferred solvents may be organic or inorganic; a pure solvent or a mixture of solvents; volatile or non-volatile. Even some gases or solids can become solvents under some special conditions such as, for example, liquid carbon dioxide and polyethylene glycol (PEG) at a temperature greater than each's respective melting point. Common organic solvents that can be used in embodiments of the subject method include, but are not limited to, ethanol, isopropanol, acetone, alkanols, ketones, esters, ethers, and other chemicals that can dissolve hydrophobic ingredients. Inorganic or aqueous solutions can be used as solvents for hydrophilic and ionic ingredients. Moreover, co-solvents, such as, for example, crystalline excipients (e.g., urea, sugar, and synthetic polymers including povidone (PVP), polyethyleneglycols (PEG), and polymethacrylates); natural polymers including cellulose derivatives (e.g., hydroxypropylmethylcellulose (HPMC), ethylcellulose, and hydroxypropylcellulose) and starch derivatives (e.g., cyclodextrins); and surfactants (e.g., sodium laureth sulfate, inulin, Inutec® SP1 (beneo, Mannheim, Germany), Compritol® 888 ATO (Gattefossé, Saint-Priest, France, and Gelucire 44/14 (Gattefossé)), electrolytes, and some other modifiers can also be added to facilitate solubility and stability. After loading the ingredients solution into porous templates, solvents can be removed or solidified. Solvents removal can be achieved by evaporation, low-pressure drainage, and solidification by cooling under solidifying point or adding solidifying agents, or any other methods. In addition, it is also possible to use solvent vapor to carry the active ingredients into the pore space.

In certain embodiments, the active compound can be a single compound or a mixture of compounds. In preferred embodiments, the active compound is a medication. The drug medication be a fibrate, including fenofibrate, aluminum clofibrate, bezafibrate, ciprofibrate, choline fenofibrate, clinofibrate, clofibrate, clofibride, gemfibrozil, ronifibrate, simifibrate; nonsteroidal anti-inflammatory drugs (NSAIDs), including ibuprofen, dexibuprofen, fenoprofen, flurbiprofen, ketoprofen, oxaprozin, naproxen, dexketoprofen, loxoprofen, aspirin, salicylic acid, diflunisal, salsalate, indomethacin, tolmetin, sulindac, etodolac, ketorolac, diclofenac, aceclofenac, bromfenac, nabumetone, piroxicam, meloxicam, tenoxicam, droxicam, lornoxicam, isoxicam, phenylbutazone, mefenamic acid, meclofenamic acid, flufenamic acid, tolfenamic acid, celecoxib, rofecoxib, valdecoxib, parecoxib, lumiracoxib, etoricoxib, firocoxib, nimesulide, clonixin, licofelone, and H-harpagide; trimebutine; asimadoline; fedotozine; Angiotensin-converting-enzyme (ACE) inhibitors including ramipril, alacepril, captopril, zofenopril, enalapril, quinapril, perindopril, lisinopril, benazepril, imidapril, trandolapril, cilazapril, fosinopril, arfalasin, casokinins, lactokinins, and lactotripeptides, particularly Val-Pro-Pro and Ile-Pro-Pro; and anti-fungal medications, including imidazoles, such as bifonazole, butoconazole, clotrimazole, econazole, fenticonazole, isoconazole, ketoconazole, luliconazole, miconazole, omoconazole, oxiconazole, sertaconazole, sulconazole, and tioconazole, triazoles, thiazoles, allylamines, echinocandins; or any other medications suitable for the subject methods.

Templates

A template is a porous medium that provides interstitial pore spaces to contain the active ingredients. Template structures are formed by carefully arranging the packing elements such that the interstitial space between the elements is capable and suitable to contain the one or more active compounds.

According to the classical nucleation theory, a critical nucleation size must be reached before crystallization can spontaneously proceed. Below or near the critical size, the amorphous state is more stable than the crystalline state. Therefore, it is feasible to achieve and maintain a stable amorphous state if the active ingredients are kept under or near the critical nucleation size. To achieve this goal, the active compounds are confined inside interstitial porous space with pore size under or near the critical nucleation size, typically at nanometer scale. Moreover, small-sized ingredients are more active due to their large surface area and surface energy. As a result, the porous templates used in the subject methods should be able to provide small enough interstitial spaces with large internal surface area. However, small interstitial spaces also make it difficult to load the compounds into porous templates and may limit the loading capacity of templates. Therefore, templates should be carefully designed to achieve both a high activity of ingredients and a good loading efficiency.

As a typical approach, interstitial spaces are commonly produced by packing individual particles. To achieve an ideal packing condition, a careful consideration on porosity, mean pore size, mean particle size, agglomerate degree, permeability and specific surface area is required.

Porosity, which is the fraction of the volume of voids over the total volume, may depend on packing architecture, degree of agglomeration, element particles' homogeneity and morphology. For monodispersed spheres without any agglomeration or crosslinking, the porosity of the densest regular packing (face-centered cubic crystal structure (FCC) or hexagonal closest packed crystal structure (HCP) lattice) is 26% and that of the random close packing is 36%. By contrast, the porosity of the loosest regular packing is 48% and that of the random loose packing is 41%. Therefore, the porosity of homogenous sphere packing ranges between 26%-48%. However, agglomeration or gelation may increase the porosity to above 99% (e.g., aerogel). In addition, element particles' inhomogeneity or polydispersity also plays an important role on porosity by providing more choices for particle arrangements: small particles may effectively fill the pores between large ones and drastically reduce porosity, and at the same time increase the specific surface area per unit pore volume. Thus well-sorted particles with approximately the same size typically have a higher porosity than poorly-sorted or inhomogeneous counterparts. On one hand, porous templates with a high porosity are advantageous for their large capacity (40% or more) and easy infiltration of active ingredients into templates; on the other hand, however, small porosity has the advantage of large specific surface area.

For sphere packing, normalized mean pore size ($ND_p$) is proportional to porosity ($ND_p=C*\varphi$), and it has a similar relation with the degree of agglomeration ($ND_a$): i.e., the normalized mean pore size will increase when the porosity and/or agglomeration degree increases. In some embodiments, small pore sizes ($D_p$) are preferred, which can be obtained by decreasing the value of particle size $D_e$, agglomeration degree $ND_a$, or porosity (p. The pore size $D_p$ can be adjustable from the smallest size, the molecular size of active ingredients, 0.1 nm to 1 nm, to the largest size, 10-times to 100-times the critical nucleus size of the active ingredients. It is possible to achieve porous templates with $D_p$ ranging from about 0.5 nm to about 500 nm, preferably between about 1 nm and about 50 nm, because colloidal particles with $D_e$ between 5 nm and 5000 nm are inexpensive, stable, well-sorted and commonly used in various industries. In certain embodiments, the pore size of the porous template is about 10% to about 10000% of the critical nucleus size of the active compound, preferably about 10% to about 1000%. The pore size can be measured using electron microscopy.

Permeability of sphere packing can be calculated by Kozeny-Carman equation, $$\kappa = a \frac{\varphi^3 Dp^2}{(1-\varphi)^2},$$

which depends on pore size $D_p$ to the second power and the porosity $\varphi$ to the third power. Typically, a high permeability is preferred for a better infiltration, but, at the same time, small pore sizes $D_p$ may also be required. Therefore, a balance between these parameters should be carefully considered and designed.

Specific surface area (SSA) depends on complex parameters. A larger SSA can be achieved with a smaller particle diameter $D_e$. For packings of particles with the same $D_e$, SSA increases as porosity ($\varphi$) and/or agglomeration ($ND_a$)

degree decrease. A strong agglomeration will significantly reduce SSA. Supposing that most of the porous volume is filled with active ingredients, SSA hence represents the surface area or energy per unit volume of products. Therefore, a large SSA is crucial to increase the ingredients activity.

Besides spherical particles, other element shapes, including but not limited to, cubes, pyramids, rods, and/or platelets can also be used in the templates. Different element shapes can provide more possibilities of template structures; and, integrating multiple shapes into one sample may achieve a better performance on specific surface area and mean pore size. Therefore, particle morphologies and their combinations can provide a new parameter space for templates with better porosity, surface energy, and performance.

The interstitial spaces of porous templates may initially be filled with a gas, liquid or a solid. The ingredients can subsequently enter these spaces driven by capillary force, external pressure, dissolution into interstitial materials, diffusion, or by other means.

Making a successful composite of template and active ingredient typically requires two steps: template preparation and then loading the active ingredients.

Template Preparation

In some embodiments, the template can be prepared by packed dry colloidal particles. In some embodiments, dry porous materials with nanometer scale pores can be made by, for example, acid etch, chemical synthesis, flame pyrolysis, which can be directly used as porous templates.

In some embodiments, the template can be prepared by packing particles initially dispersed in colloidal suspensions. Various types of particles can be used, such as, for example, silica[1], alumina, calcium carbonate, metal dioxide, carbon[2], and/or polyester beads. In preferred embodiments, silica particles are used in the colloidal suspensions. Colloidal suspensions have the advantage of uniform particle size and a broad size range from 1 nm to 100 nm in diameter. In certain embodiments, the particle size is about 1 nm, 5 nm, about 7 nm, about 12 nm, about 22 nm, about 44 nm, about 60 nm, about 80 nm, or about 100 nm. In certain embodiments, larger particles can maintain their spherical shapes better, while smaller particles can merge together and achieve a larger degree of agglomeration.

The colloidal suspension can be about 1% to about 99%, about 10% to about 80%, about 10% to about 60%, about 25% to about 50%, or about 30% to about 40% solid mass, with the remaining portion comprising a solvent and, optionally, other chemicals, such as, for example, pH buffers, co-solvents, and surface modifiers for templates which are soluble in the corresponding solvent. The suspensions are typically stabilized by either the electric repulsion or the steric repulsion, which inhibits the agglomeration of particles. In certain embodiments, stabilizers can be used to inhibit the suspended particles from agglomeration. For example, the concentration of ionic stabilizers can be less than 1%, preferably in the range of about 0.05% to about 0.5%. The concentration of steric stabilizers can depend on the specific situation under the maximum equilibrium proportion, with a range of about 0.1% to about 99%. Stabilizers can also be, for example, sodium counter ions, ammonium counter ions, or other counter ions, such as, for example, phosphate counter ions, poly(ethylene oxide), poly(vinyl alcohol), poly(methacrylic acid), and poly(acrylic acid), polyacrylamide. The ammonium counter ions can be more bio-friendly and pH stable throughout the template production process.

In certain embodiments, the pH value of the suspension can also be varied in a range of about 2 to about 12, about 4 to about 10, about 6 to about 8, or about 8. A change in pH, usually a lowering of pH, can cause the particles in the template to become more spherical and intact, while a higher pH value tends to increase the degree of merge and agglomeration. In certain embodiments, acids or bases can be added to the suspension to modify the pH.

In certain embodiments, to pack colloidal suspension particles into a porous template, various approaches such as sol-gel process, centrifugation, gelation induced by IR or UV-VIS, and phase separation can be used. Templates produced by sol-gel process can achieve different structures with only small changes in conditions[3], such as the pH, concentration, electrolytes, temperature, and thus may find broad applications under various circumstances. For stable colloidal suspensions, centrifugation is a common method to pack particles. In addition, modifying particle surfaces to make them sensitive to light, pH, certain ions, and/or temperature, can result in cross-linkage or gelation triggered by these parameters. In certain embodiments, the particles can be concentrated with phase separation by adding electrolytes, applying specific solvents, changing the pH or temperature, or by other means.

In certain embodiments, the colloidal suspensions are spread and/or poured onto a surface. The surface can be glass, metal, plastic, wood, ceramic, clay and/or other surfaces. In preferred embodiments, the colloidal suspensions are spread onto glass Petri dishes into thin layers, which can allow for fast evaporation. In certain embodiments, the suspension can evaporate either rapidly inside a low-pressure chamber or slowly in open air. In certain embodiments, the pressure can be about 0.001 atm to about 1 atm or, preferably, about 0.01 atm to about 0.2 atm. In certain embodiments, the temperature can be about 18° C. to about 100° C. or, preferably, about 70° C. to about 100° C. In preferred embodiments, the initial temperature and pressure can be set to 70° C. and 0.2 atm for about 30 minutes, and the pressure can be adjusted as needed to achieve the fastest evaporation rate while avoiding boiling at low-pressure. The colloidal suspensions can be maintained at 70° C. and 0.01 atm for another 3 hours. After that, the colloidal suspensions can be heated to at least about 100° C. for one hour to dry the solvent completely.

In some embodiments, wet templates filled with interstitial liquid are directly used to load active ingredients. Interstitial liquid may promote the mobility of active ingredients during the loading process. It may also help the templates from collapsing and maintain the initial structures. In some other embodiments, however, interstitial liquid needs to be removed to achieve the templates. Various drying methods[4,5] such as slow vaporization, high temperature, low pressure, freeze dry, and/or supercritical drying can be used.

However, some methods may cause over agglomeration undesirable for templates. Many approaches can be implemented to suppress over agglomeration during sol-gel process, such as changing pH, concentration, electrolytes, temperature, evaporating under vacuum, or combinations thereof.

Loading the Active Ingredients

Several methods are introduced herein to load the active ingredients into the pore space of templates. For ingredients that are stable above melting temperature, melted, liquid ingredients can be directly used for loading. For ingredients unstable at high temperatures, their solutions dissolved in specific solvents can be used. However, loading such solutions may require solvent removal afterwards. Besides liquid solvent, solvent vapors may also be used to carry active ingredients into the pore space. Because vapors can easily leave the system, there is no need for solvent removal afterwards. Active ingredients in their solid state can also be used directly for loading into the pore space.

For loading liquid samples such as melt or solution, the Lucas-Washburn equation[6] predicts the imbibition length in a small capillary as:

$$L = \sqrt{\frac{Rt\sigma\cos\theta}{2\eta}}.$$

Here R is the capillary or pore radius, t is the imbibition or loading time, $\sigma$ is the surface tension, $\theta$ is the contact angle, and $\eta$ is the liquid viscosity. In certain embodiments, increasing the loading time or decreasing the liquid viscosity can effectively enhance the loading outcome, given that the pore size and wetting properties of a porous template are typically fixed. Thus loading samples under high temperature (to reduce viscosity) with long enough time, such as, for example, several hours to days, can be useful.

To facilitate the imbibition or loading of ingredients into the template pores, increasing the contact area is also desirable. Therefore, at room temperature below the melting point, both the solid ingredients and the porous templates can be ground into 0.1 µm to 1000 µm powders and mixed together. In certain embodiments, modifiers, such as, for example, silanes with various functional groups (e.g., amino-, halo-, hydroxyl, carboxyl, alkyl-, thiol-, or phenyl-) or lubricating agents such as, for example, minerals (e.g., talc or silica) or fats (e.g., vegetable stearin, magnesium stearate, or stearic acid) can also be added for a better imbibition mobility or wetting property. The mixed powders can then be pressed under high pressure to achieve a better mutual contact. The temperature can be raised, such as, for example, above the melting point but below the thermal degradation temperature of the specific active ingredient during the pressing process or after pressing, to melt the active ingredients, which can effectively load the melted active compounds into the pores. In certain embodiments, some solvent vapors, such as, for example low molecular mass alcohol (e.g., ethanol or isopropanol), alkane (e.g., butane), alkene (e.g., kerosene), ether (e.g., DME), aromatic compound (e.g. esters or terpenes) or other organic or inorganic vapors, can be flowed into the mixture to carry the ingredients into the pore space. Another loading approach is to directly infiltrate ingredients solutions or melts into templates by applying pressure gradient. To achieve a high loading efficiency, repeated impregnation may also be applied.

To load the active compounds into dry templates, in certain embodiments, the active compound and the templates can be ground into powders, and then mix the two types of powders uniformly. The mixture can subsequently be compressed by hydraulic press inside a mold, or by other related means, into tablets at the pressure of about 10 to 100 MPa or even higher. The tablets can, optionally, then be baked at a temperature above the active compound's melting point for a suitable period of time of at least about 2 s, about 3 s, about 5 s, about 30 s, about 60 s, about 5 min, about 10 min, about 15 min, about 30 min, about 60 min, about 2 h, about 3 h, about 4, about 5 h, or greater. During the baking period, the active compound can melt and imbibe into the nano-pores of the templates. After the baking period, the sample is cooled to room temperature (about 18° C. to about 28° C.) and becomes the final product: the composite. In certain embodiments, the mixing of the solid active compound and the solid template is sufficient to load the active compound into the template, without melting the mixed compounds. With the high capillary pressure of nano-sized pores (e.g., at least about 1 MPa), the crystalline ingredients can be absorbed into nano-pores as well as transform from crystalline to an amorphous structure.

Because the drug re-solidifies inside nano-sized pores that are below or about the critical nucleation size, the active ingredient reaches an amorphous state at nanometer scale. Such a state has an ultra-high free energy and thus a much better dissolution rate and solubility compared with its crystalline counterpart. Because many newly developed drugs and drug candidates have very poor water solubility, the present invention can thus solve this important issue by achieving a nano-amorphous material state with very high free energy and large specific surface area. Moreover, the composite can remain at this nano-amorphous state over a long period, from several months to more than one year.

To load active ingredients into wet templates, a colloidal suspension of nanoparticles is centrifuged. With centrifugation the nanoparticles can be concentrated in the colloidal suspension. The supernatant can be removed to obtain a wet porous template that has pore spaces filled with the liquid in which the particles were suspended; the liquid can be water or other solvents, including organic solvents. The active compound can then be heated to a temperature sufficient to melt the active compound. The melted active compound can then be placed in direct contact with the wet porous template. The combination of the melted active compound and the wet porous template can be kept at temperature adequate to maintain the active compound in a liquid form (melted). The elevated temperature can also cause the interstitial liquid in which the particles were suspended to evaporate. After several hours at a high temperature, such as, for example 80° C., the interstitial liquid evaporates completely and the active ingredient replaces it and fills the pore space. The sample is then cooled to room temperature and the melted active compound re-solidifies inside the nanometer sized pores. The composite with nano-amorphous state of the active compound is thus achieved.

In addition, this invention makes it possible for composites to disintegrate in a controlled manner, in the following two aspects: a) rapid release in targeted solvents and b) slow and controllable release with respect to time.

Rapid Release in Targeted Solvents

In different templates, the dissolution profile of active ingredients may differ significantly. In certain embodiments, the particles of templates may be hydrophilic or hydrophobic, oleophilic or oleophobic, acid-labile or alkaline-labile, or even directly dissolvable in certain solvents. As one example, to dissolve oleophobic ingredients in oleic solvent for some industrial or medical purposes, it is desirable to use template particles that are made from oleophilic polymers or have surfaces modified with oleophilic groups. Moreover, chemical bonds between template particles may be broken in certain solvents. For example, templates made by aqueous polymerization dominated by hydrolysis and hydration are extremely sensitive to the pH value of solvents. This type of templates may easily decompose in solvents with specific pH values, such as the low pH of succus gastricus (gastric juice) or succus entericus (intestinal juice), a pH greater than 11, or a pH less than 4. Therefore, by choosing appropriate templates materials, our invention provides an approach to rapidly dissolve the product in targeted solvents.

Slow and Controllable Release with Respect to Dissolving Time

The subject methods can also realize slow and controllable release by choosing the appropriate template. In certain embodiments, active ingredients inside templates have high free energy and are thus soluble with a high dissolution rate. In some embodiments, the properties of templates can control disintegration rate of the composites. Template parameters, such as, for example, porosity, pore size, agglomerate degree, specific surface area, and wetting properties, can directly influence the disintegration rate of templates. More specifically, composites with large specific surface area (about 50 $m^2/g$ to about 250 $m^2/g$), small pore size (about 0.5 nm to about 50 nm) and highly connected porous channels significantly increase disintegration rate, while strong and semi-closed structures with high agglomeration degree and low porosity may strongly suppress disintegration. Careful designs on these parameters can achieve ideal disintegration rate of templates ranging from seconds to a few weeks. The active ingredients can achieve immediate release, which can release the active ingredient within a few seconds after putting the active ingredient into a solvent for fast adsorption and accurate dosage control; extended release, which can prolong the release time of the active ingredient from a few seconds to minutes, hours, days, or even for weeks to reduce dosing frequency; or delayed release, which can release the active ingredient after a certain amount of time (e.g., at least 1 min, 2 mins, 5 mins, 10 mins, 15 min, 30 mins, 45 mins, 1 h, 2 h, 3 h, 4 h, or a greater amount of time) to control where to release the active ingredient, such as, for example, in the digestive tract, and the delayed release can also control when the active ingredient is absorbed in a subject. Moreover, a hierarchical architecture of templates may also be designed, which can steadily release ingredients as macro- and microstructures which decompose in an ordered manner.

All patents, patent applications, provisional applications, and publications referred to or cited herein are incorporated by reference in their entirety, including all figures and tables, to the extent they are not inconsistent with the explicit teachings of this specification.

Following are examples that illustrate procedures for practicing the invention. These examples should not be construed as limiting. All percentages are by weight and all solvent mixture proportions are by volume unless otherwise noted.

EXAMPLES

Example 1—Template Preparation with the Method of Fast Evaporation Under Vacuum

Silica colloidal suspensions (1 nm to 100 nm in diameter), are spread on glass Petri dishes into thin layers for evaporation. These glass Petri dishes are then put inside a vacuum oven with controlled temperature and pressure. The initial temperature and pressure were set to 70° C. and 0.2 atm, and appropriate adjustment on pressure is needed to achieve the fastest evaporation rate while avoiding boiling at low-pressure. Within 30 minutes, most of the solvent water has evaporated and we keep the samples at 70° C. and 0.01 atm for another 3 hours. After that, we bake the samples above 100° C. for one hour to dry the water completely.

Figure 1B:
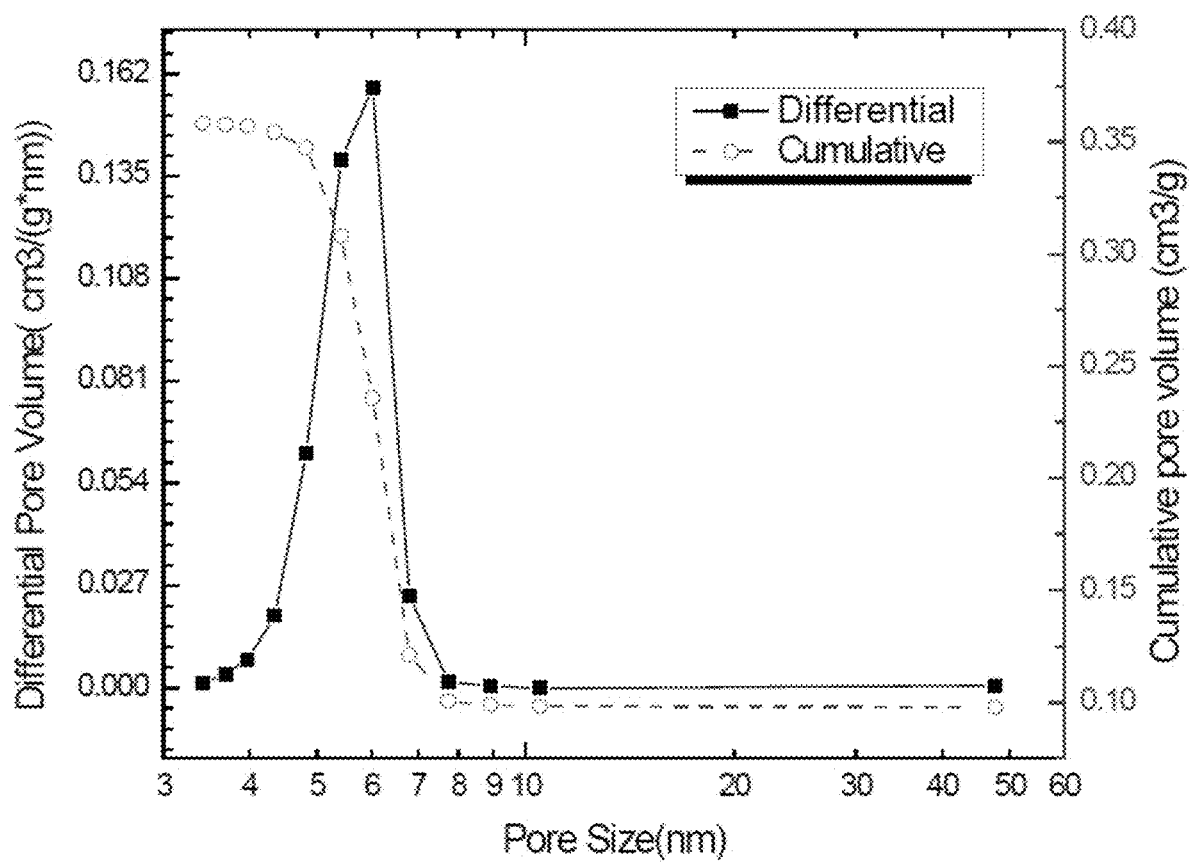

The templates made by the fast evaporation under vacuum method are then analyzed by BET (porous surface measurement based on Brunauer-Emmett-Teller theory) apparatus for pore size distribution. One typical sample made from 22 nm colloids is shown in FIGS. 1A-1B. FIG. 1A illustrates the raw data of nitrogen absorption and desorption curves, and FIG. 1B shows the distribution of pore volume with a pronounced peak at 5 nm-7 nm. More specifically, large pores above 8 nm occupy about 10% of the total sample volume, and small pores below 8 nm take roughly 26% of the total sample volume. Adding together, we find that about 36% of the total sample volume is pore space (i.e., the porosity is about $\varphi=36\%$).

Example 2—Loading Active Ingredients into Dry Templates

This example describes the method of loading the active ingredients into dry templates. We take the drug Fenofibrate as one specific example of active ingredients. Fenofibrate is used to treat abnormal cholesterol level, which is a poorly water-soluble medicine with the melting temperature of 80.5° C. We load the Fenofibrate (99% crystal) into porous templates in four steps: (1) grinding the Fenofibrate crystal and the porous template into powders, (2) mixing the two types of powders uniformly, (3) pressing the mixture into tablets, and (4) baking the tablets at high temperature.

More specifically, we first grind the Fenofibrate crystal and the templates into powders, and then mix the two types of powders uniformly. The mixture is subsequently put into a mold and compressed by hydraulic press into tablets, at a high pressure above 10 MPa. The tablets are then baked at a high temperature for multiple hours. During the baking period, the drug melt is imbibed into the nano-pores of the templates. After the baking period, the sample is cooled to room temperature and becomes the final product: the composite.

Because the drug melt re-solidifies inside nano-sized pores that are around the critical nucleation size, the active ingredient reaches an amorphous state at nanometer scale. Such a state has an ultra-high free energy and thus a much better dissolution rate and solubility compared with its crystalline counterpart. Because many newly developed drugs and drug candidates have very poor water solubility, the present invention can thus solve this important issue by achieving a nano-amorphous material state with very high free energy and large specific surface area. Moreover, the composite can remain at this nano-amorphous state over a long period, from several months to more than one year to achieve a long shelf life.

Figure 2A:
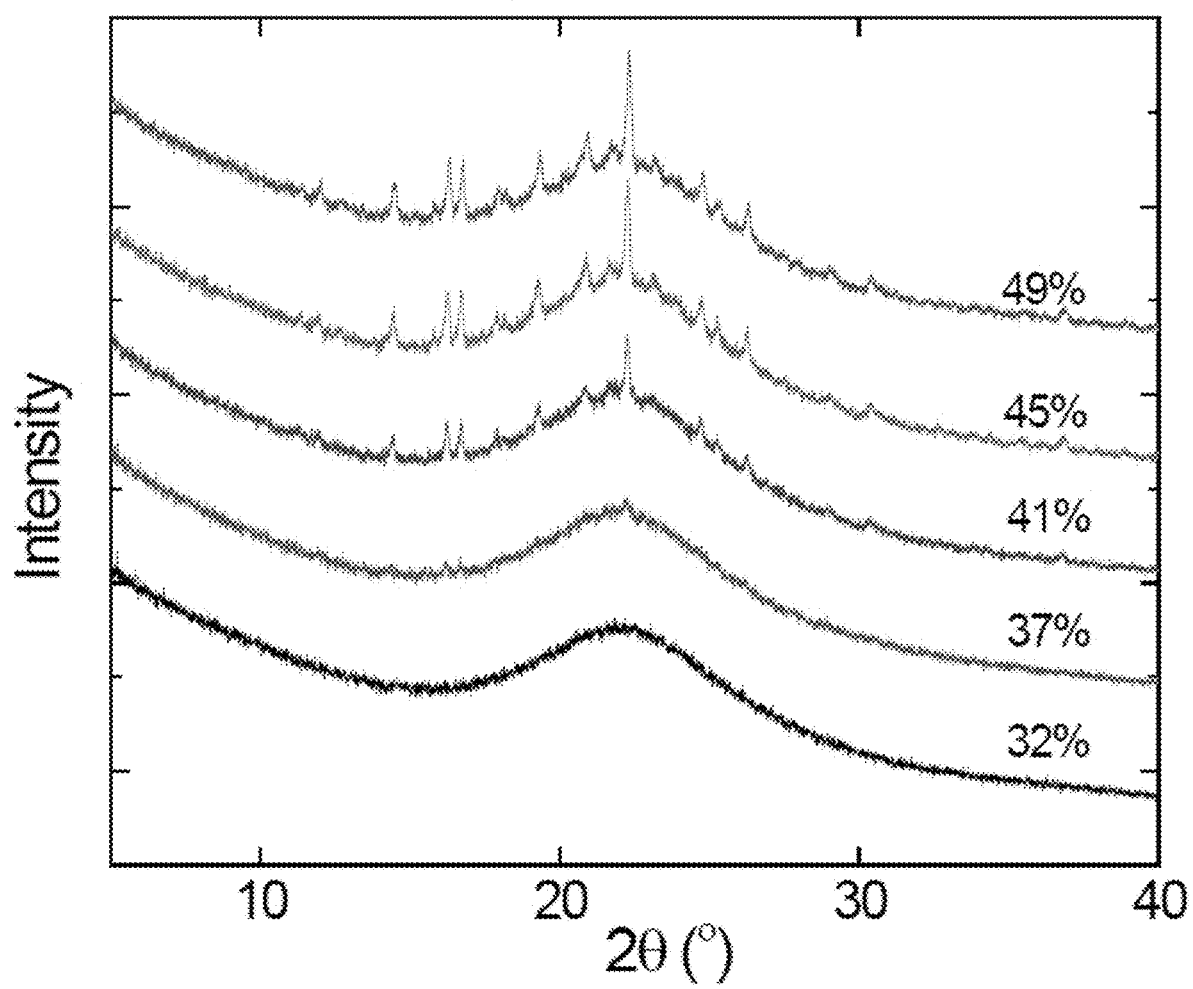
FIGS. 2A-2B include X-ray Powder Diffraction (XRD) and Differential Scanning Calorimetry (DSC) analysis on composites with different loading fractions. Crystalline component starts to appear and grow at 37% of volume fraction.

To study the maximum amount of nano-amorphous ingredient that can be produced inside the composite, we load different amount of Fenofibrate into the templates formed by 22 nm particles. The samples are then measured with XRD (X-ray Powder Diffraction) to test their crystallinity, as shown in FIG. 2A. For clarity, we shift the curves vertically and put higher fraction curves at higher positions. The fraction here is defined as the volume of the Fenofibrate divided by the sum of Fenofibrate and particle volume. Apparently, crystalline peaks start to appear and grow above 37% of drug fraction, and the sample is completely amorphous at and below 32% fraction.

Figure 2B:
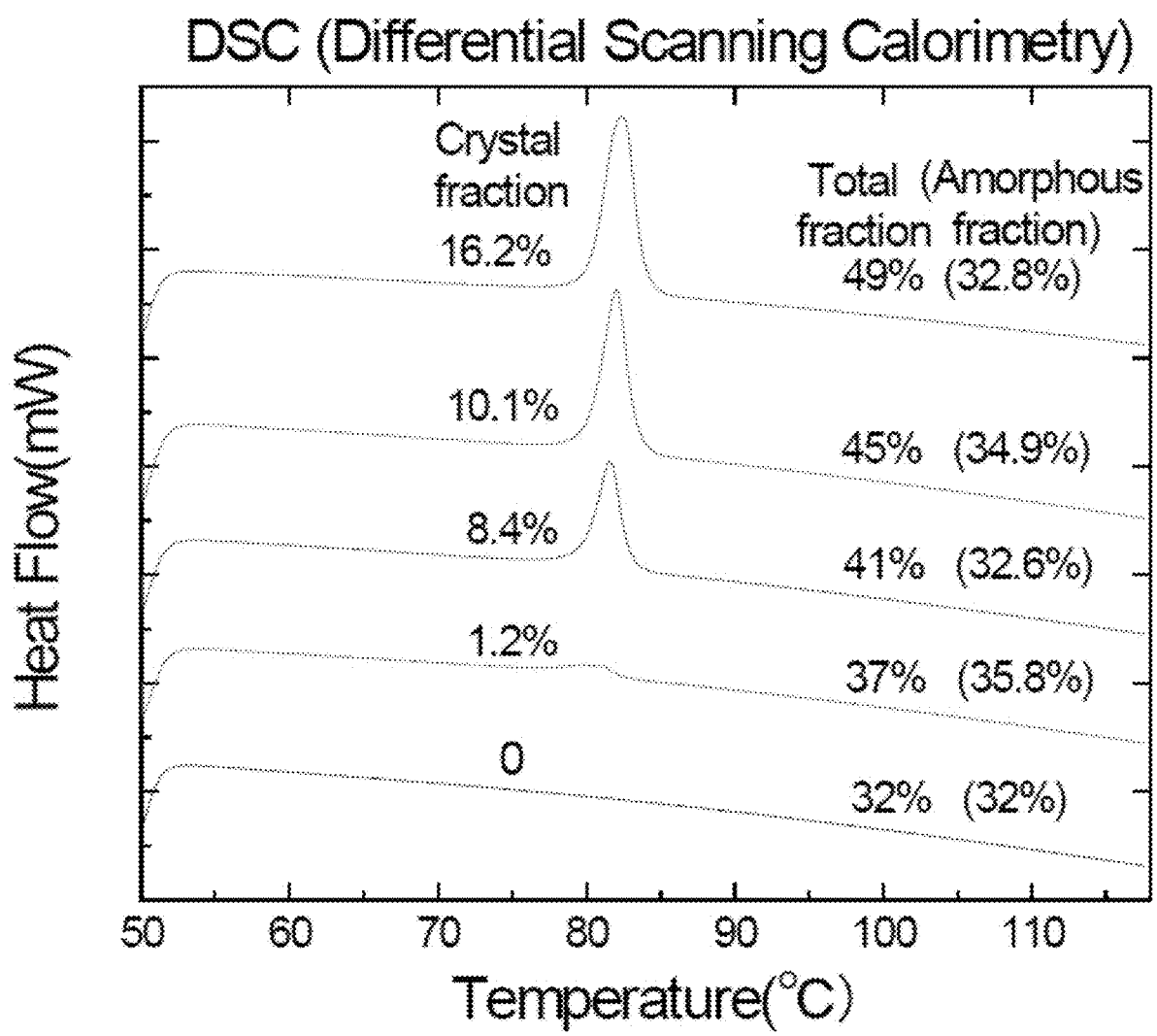

To quantify the crystalline amount of Fenofibrate versus amorphous amount within one sample, we perform the DSC (Differential Scanning Calorimetry) measurements on the FIG. 2A samples and show the results in FIG. 2B. Clearly, crystalline Fenofibrate starts to appear at the fraction of 37% and grows afterwards. However, the amorphous fraction remains roughly as a constant around 32%-36%. This fraction is close to the pore volume fraction of 22 nm templates as shown in FIG. 1A. Therefore, the maximum amount of amorphous ingredient is limited by the pore space of the template, and solidification out of the pore space leads to crystalline structure.

Example 3—Microscopic Structure and Temporal Stability of the Composites

TEM (Transmission electron microscopy), XRD (X-ray Powder Diffraction) and DSC (Differential Scanning Calorimetry) measurements are performed on the composite produced in Example 2 for preliminary analysis on the microscopic structure and amorphous fraction of the active ingredients.

Figure 3A:
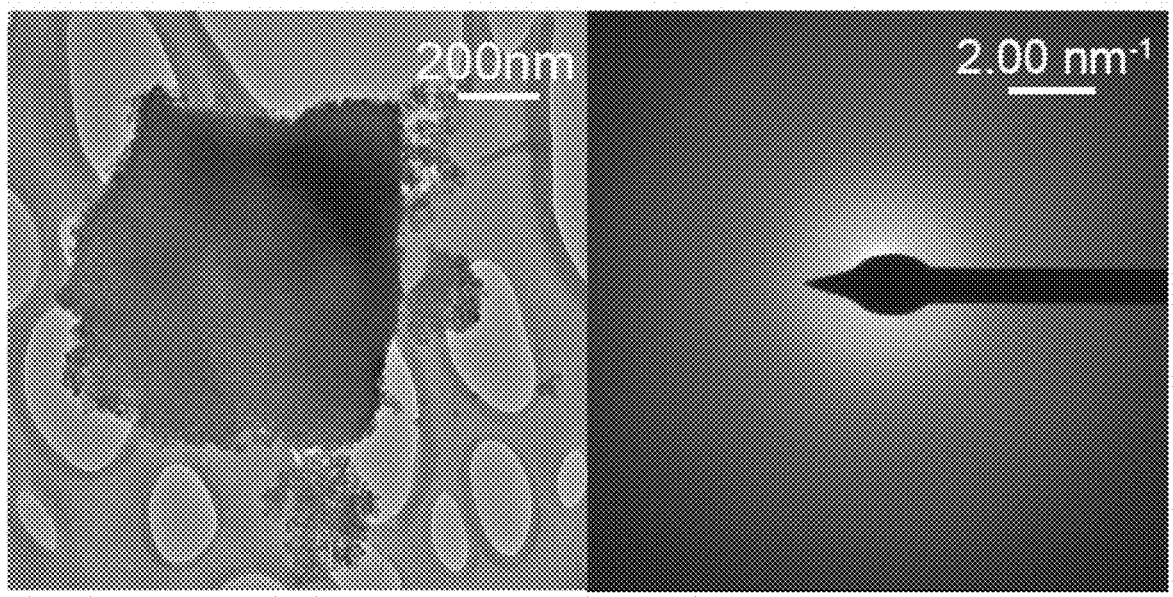
FIGS. 3A-3C show the transmission electron microscopy (TEM) images and the electron diffraction patterns of the template without drug (FIG. 3A), the crystalline fenofibrate (FIG. 3B), and the composite (FIG. 3C).
Figure 3B:
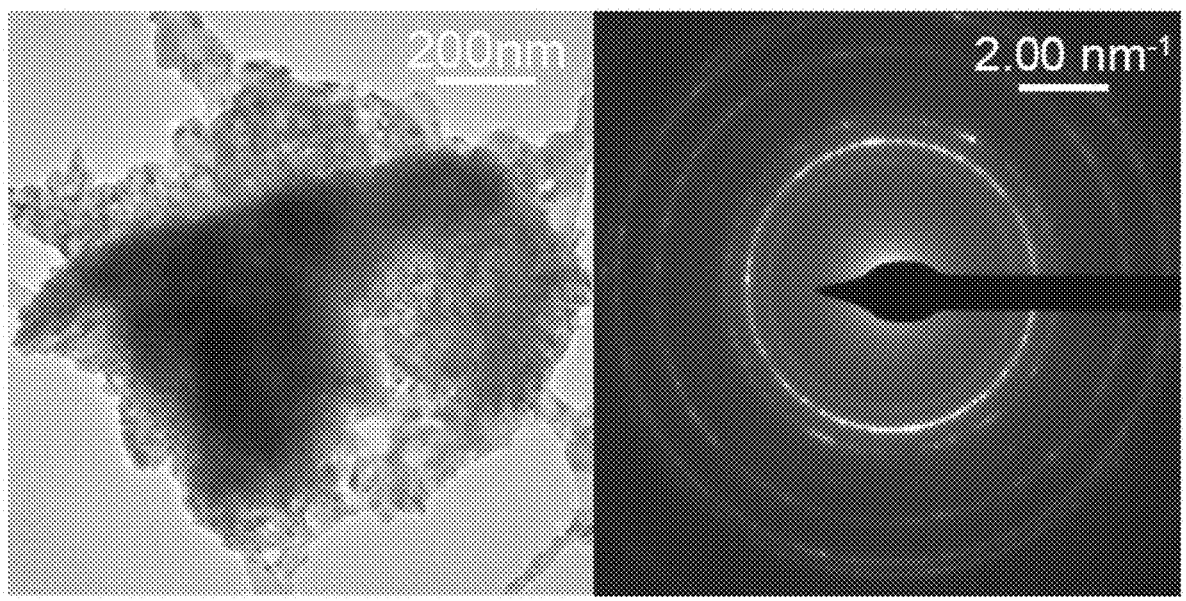
Figure 3C:
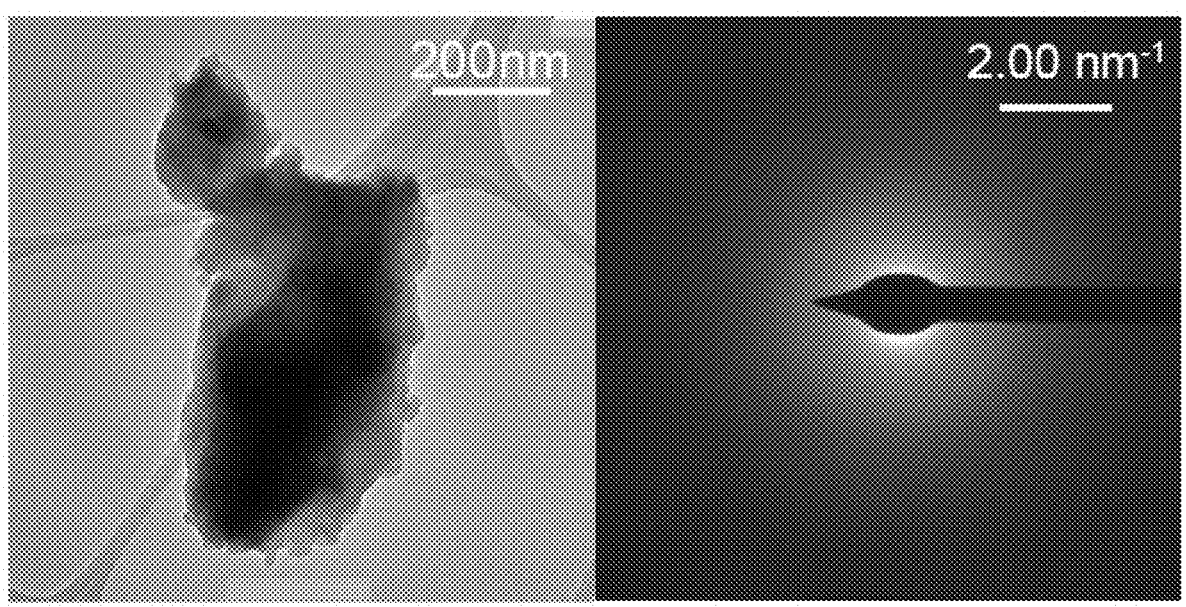

TEM images of pure template, pure Fenofibrate crystal and the composite are presented respectively in FIGS. 3A-3C. The left panels are the real space images and the right panels are diffraction patterns in the Fourier space. In FIG. 3A, the template is clearly composed by closely-packed silica particles (left panel) and these particles are microscopically amorphous without any crystalline peaks (right panel). In FIG. 3B, the pure Fenofibrate crystal exhibits multiple diffraction peaks in the right panel. In FIG. 3C, the composite is formed by filling the template pores with re-solidified Fenofibrate melt (left panel), and the drug is now amorphous as indicated by the lack of crystalline peaks (right panel).

Figure 4A:
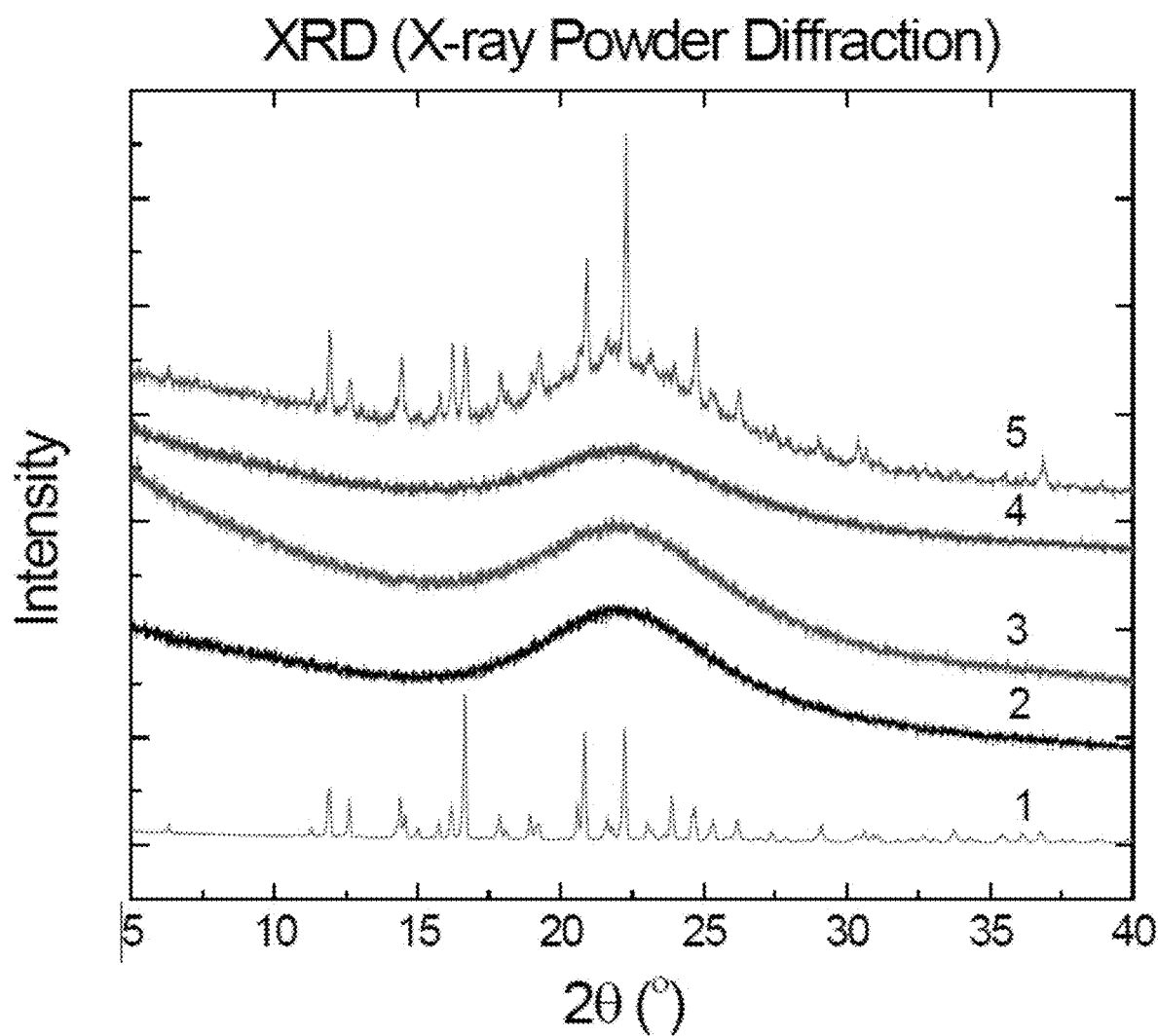
FIGS. 4A-4B show the XRD (FIG. 4A) and the DSC (FIG. 4B) measurements of fenofibrate composites and crystals. Curves 1 to 5 respectively represent (1) the crystalline fenofibrate, (2) freshly made 20% mass ratio fenofibrate composite, (3) the same 20% composite stored for 3 weeks, (4) the same 20% composite stored for 3 months, and (5) the 3-month composite recrystallized in ethanol.
Figure 4B:
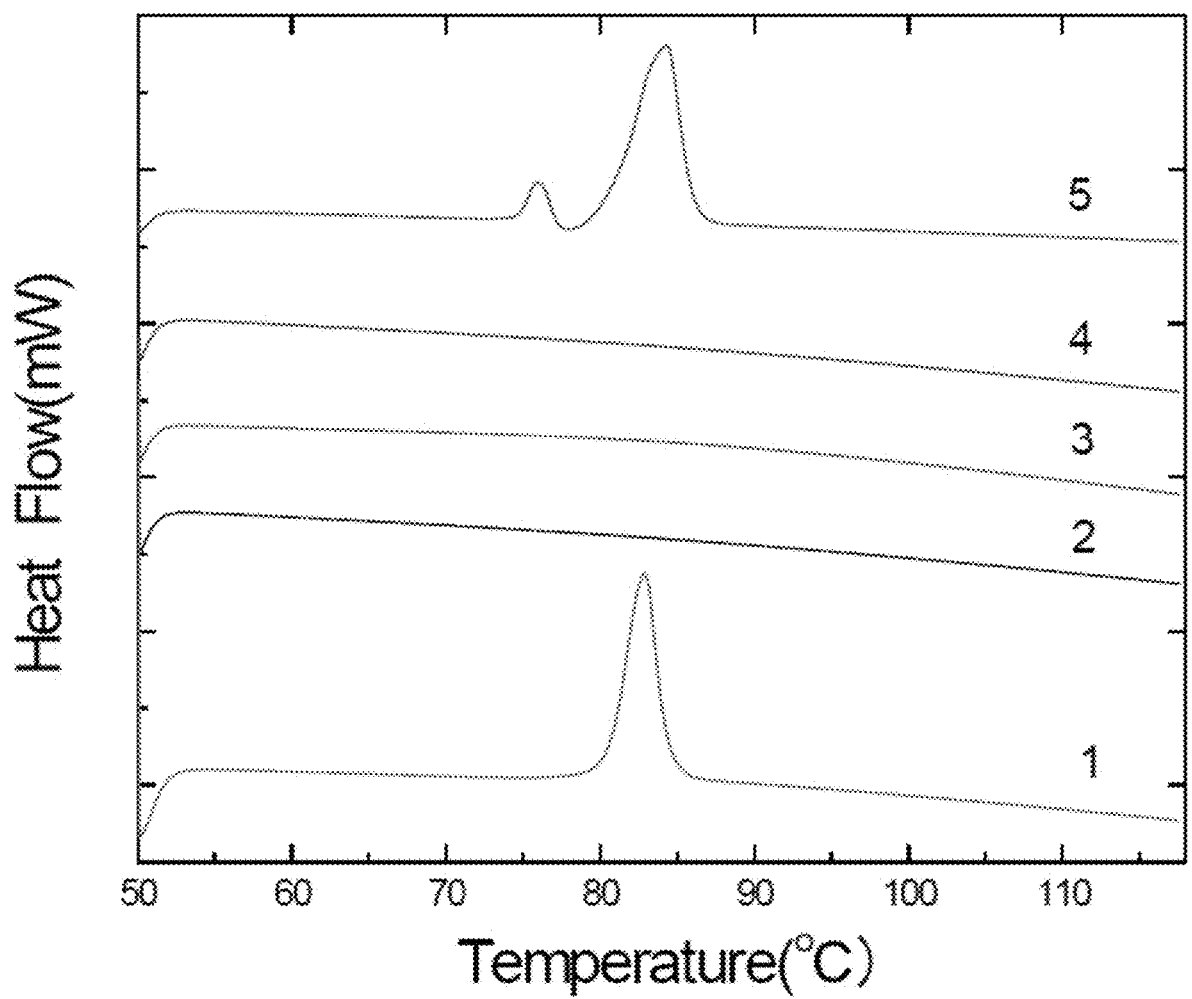

This stability issue is crucial for the shelf life of drugs. To test it, we measure the composite state versus time with XRD and DSC, in FIG. 4A (XRD) and FIG. 4B (DSC): curve 1 corresponds to the crystalline Fenofibrate sample with obvious crystalline peaks in both XRD and DSC, curve 2 is the freshly made composite without any crystalline peaks, indicating its nano-amorphous state, curve 3 is after 3 weeks and curve 4 is after 3 months and both samples remain in the nano-amorphous state over a long period of time. Curve 5 comes from the 3-month old composite sample shown in curve 4, which is dissolved in ethanol first and then re-crystalized by evaporating the ethanol. The re-appearance of Fenofibrate crystalline peaks confirms that the Fenofibrate is intact after the long-time storage at the nano-amorphous state. We also note that the DSC plot of curve 5 exhibits a smaller peak at the left of the main peak, indicating the existence of small crystals probably at nanometer scale. These systematic measurements versus time indicate that our composite is stable with respect to time, and capable of suppressing recrystallization throughout many months of storage.

Example 4—Solubility Measurement of the Composite

To test the solubility performance of our product, we dissolve the composite samples in deionized water and compare their concentrations with commercial products under the same dissolution condition. The concentration is measured by a UV spectrophotometer because the concentration is proportional to the UV absorption spectrum.

We make the composite samples as described in Example 2, and dissolve them in deionized water with the mass ratio of 1/1000 (i.e., 1 g of composite in 1 kg of water). The dissolution process takes 4 hours: we first apply ultrasound to the suspension for 1 hour and let it stand without ultrasound for another 3 hours. The supernatant of the suspension is then collected and filtered through 0.45 µm MCE Filters. Because the UV absorbance of an organic solution is proportional to its concentration as predicted by the Beer-Lambert Law, we use a UV-VIS spectrophotometer to measure the concentration of our solutions.

Figure 5:
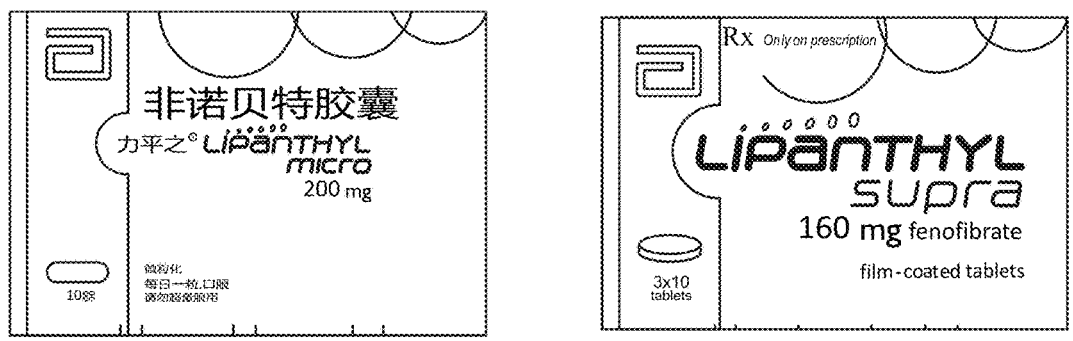
FIG. 5 shows the solubility comparison between the fenofibrate composites produced using the subject methods with different mass fractions, two commercial fenofibrate products, and crystalline fenofibrate. The solution concentration is proportional to the main peak height of the UV/VIS spectrum.
Figure 5:
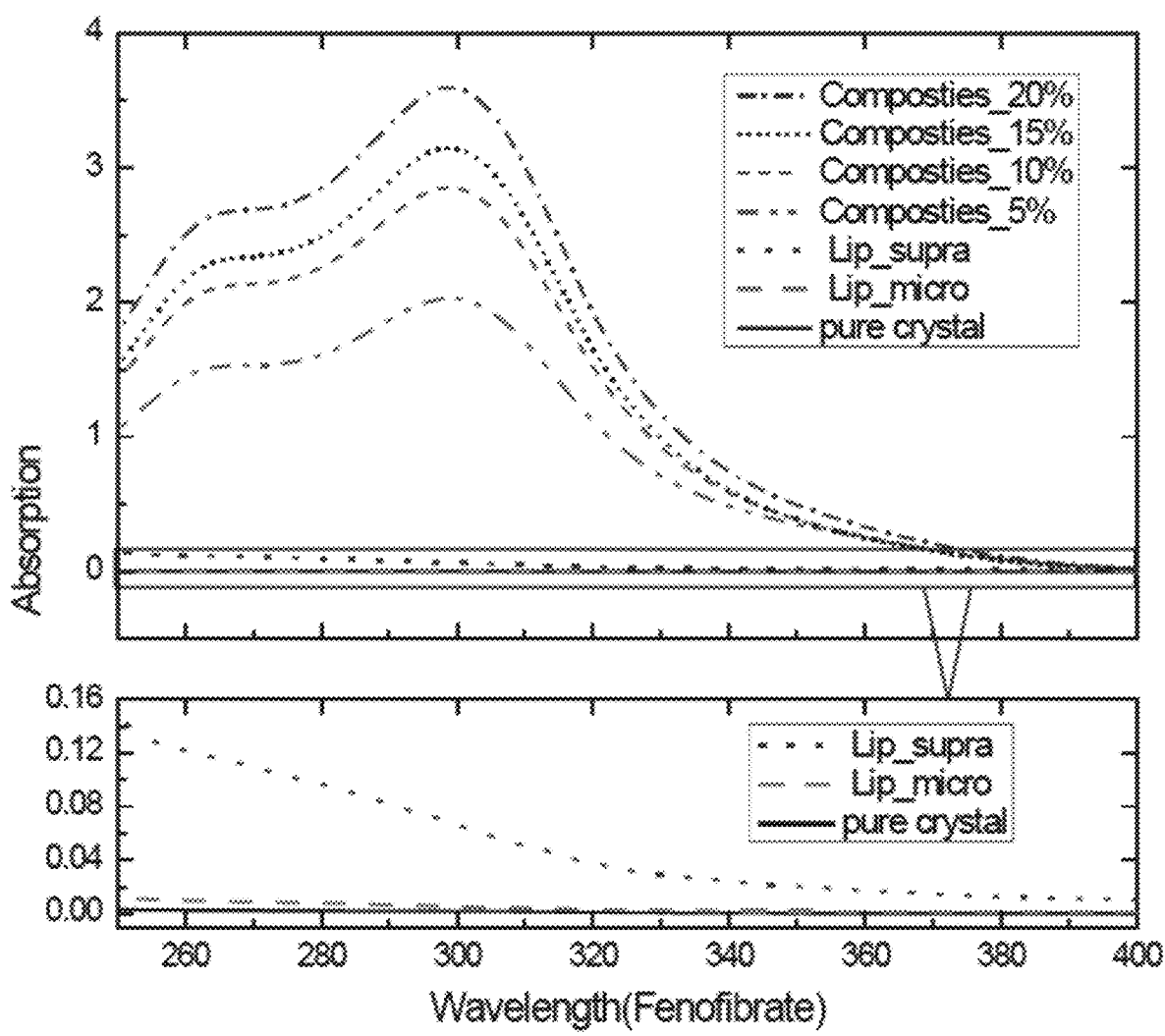

To evaluate the performance of our product, we compare them with two typical commercial Fenofibrate products on the market, and 99% pure crystalline Fenofibrate, as shown in FIG. 5. The two commercial Fenofibrate products are LIPANTHYL Micro 200 mg (an old generation shown on the upper left) and LIPANTHYL Supra 160 mg (a new generation shown on the upper right). We compare them with our composite samples at different Fenofibrate mass ratios, 20%, 15%, 10% and 5% respectively. Note that LIPANTHYL Micro 200 mg tablet has the drug mass ratio of 54% and LIPANTHYL Supra 160 mg tablet has the drug mass ratio of 22%. Although our samples contain less active ingredients, FIG. 5 shows that they achieve much higher concentrations: 10-100 times higher than the commercial products and the crystalline sample, whose curves locate at the very bottom of the plot. To illustrate these bottom curves better, we zoom in on the vertical scale and plot the enlarged bottom region in the lower panel.

To conclude, under the same dissolving conditions, i.e., the same mass of sample dissolved in deionized water, our composite samples achieve concentrations ten to one hundred times higher than the commercial products and the pure crystal. This confirms that our nano-amorphous state of drug has a much higher water solubility and thus should achieve a much better bioavailability. We further note that even with much less active ingredients, our samples can produce significantly higher concentrations. This indicates a much better drug efficiency with much less amount of expensive drug ingredient required, which may substantially reduce the cost.

Example 5—Loading the Active Ingredients into Wet Templates

Previous examples are all produced by loading active ingredients into dry templates. Besides this loading technique, we can also load active ingredients into wet templates. We use the drug Ibuprofen as one specific example for this wet template technique. Ibuprofen is a poorly water-soluble nonsteroidal anti-inflammatory drug (NSAID) which has many applications. We demonstrate how to load it into wet templates made from centrifuging the colloidal suspension of 22 nm particles. With centrifugation we densely pack the nanoparticles at the bottom of container. After removing the supernatants, we obtain the wet porous template whose pore space is filled with water. Crystalline Ibuprofen (98%, acquired from Sigma Aldrich) with the melting point of 76° C. is heated into melt and then placed on top of the wet template. We keep the sample at a high temperature to evaporate the interstitial water rapidly. After several hours water evaporates completely and the active ingredient fills the pore space. The sample is then cooled to room temperature and the Ibuprofen melt re-solidifies inside the nanometer sized pores. The composite with nano-amorphous state of Ibuprofen is thus achieved.

Figure 6:
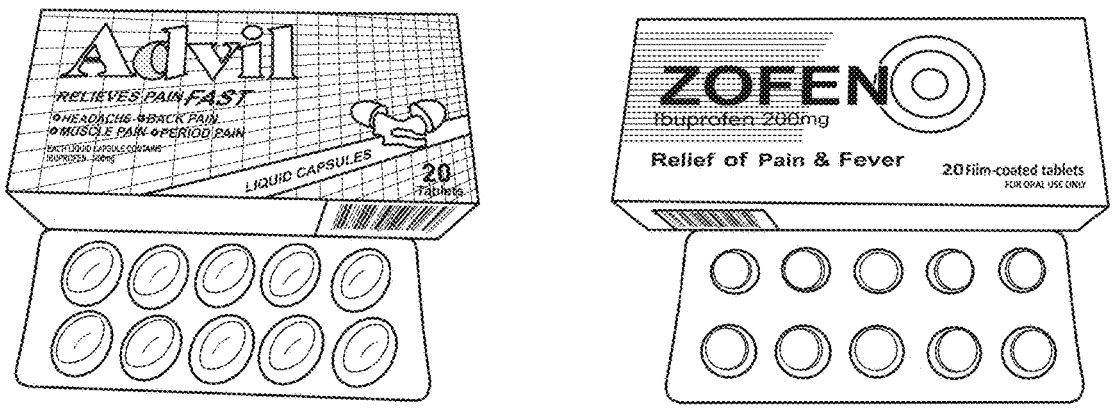
FIG. 6 shows the solubility comparison between our ibuprofen composite produced using the subject methods via wet template technique, two commercial ibuprofen products, and crystalline ibuprofen. The solution concentration is proportional to the main peak height of the UV/VIS spectrum.
Figure 6:
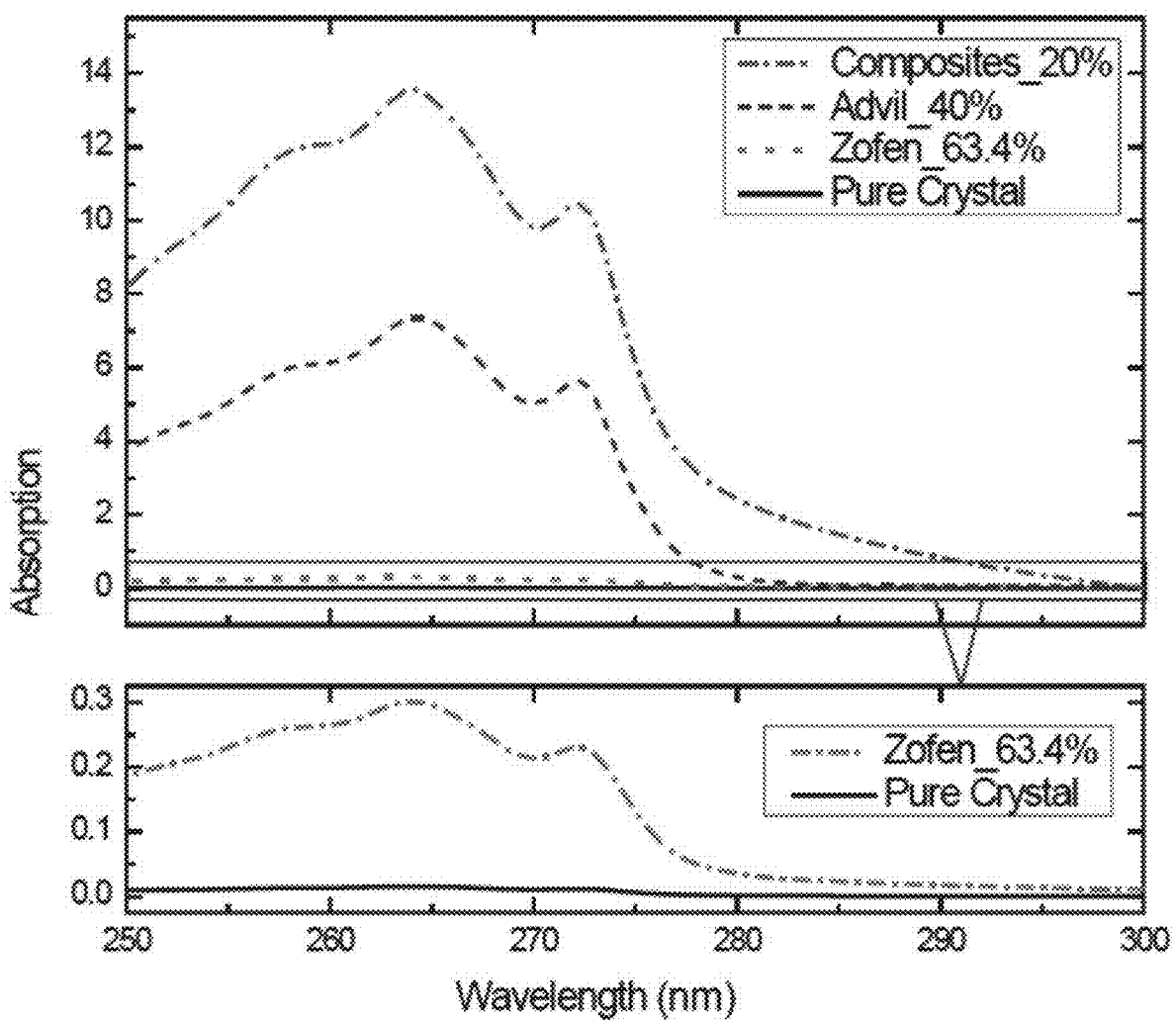

We then compare the solubility of our composite with two commercial products, Advil and Zofen, and the pure crystalline Ibuprofen. The Advil sample is a capsule filled with liquid which contains around 40% mass ratio of the drug. The Zofen sample is a solid tablet which contains around 63% mass ratio of the drug. Crystalline Ibuprofen contains about 98% of the drug. Our composite made from the wet template contains only 20% mass ratio of the drug. However, FIG. 6 shows that the composite achieves a concentration twice as high as Advil, 40-times higher than Zofen, and close to 1000-times higher than pure crystal. Once again, our nano-amorphous state of drug exhibits a much better solubility and concentration with even less mass ratio of drug. The results thus show a much more efficient usage of active ingredient of our composite, and thus much less amount of active ingredient is needed with a significantly-reduced cost.

Example 6—Various Material Properties and Conditions for Template Preparation

We can prepare our porous templates with various material properties and preparation conditions. For example, colloidal suspensions with different particle sizes, initial fractions, pH values, etc. can all be used to satisfy various pharmaceutical and other industrial demands.

Figure 7A:
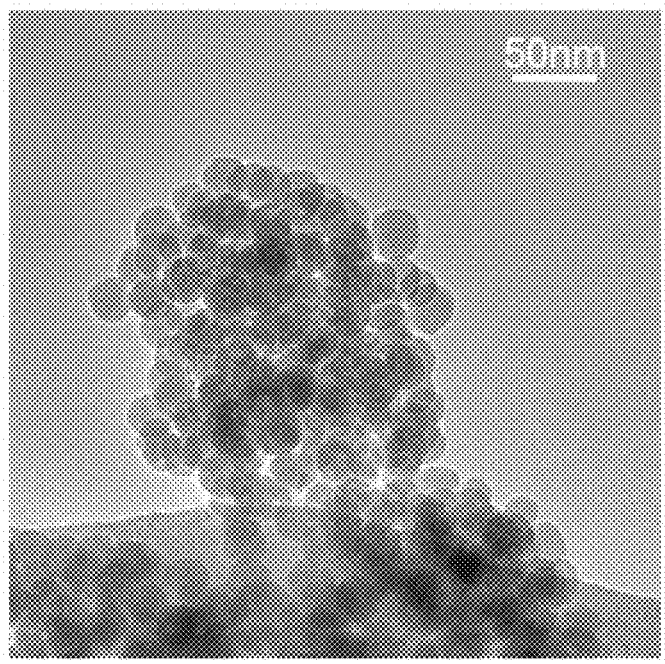
FIGS. 7A-7C show the TEM images of the templates made from 22 nm (FIG. 7A), 12 nm (FIG. 7B), and 7 nm (FIG. 7C) particles respectively.
Figure 7B:
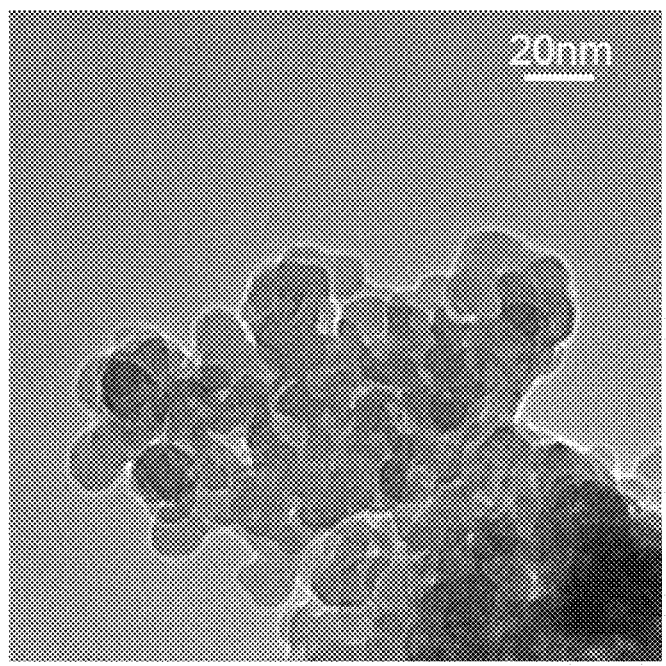
Figure 7C:
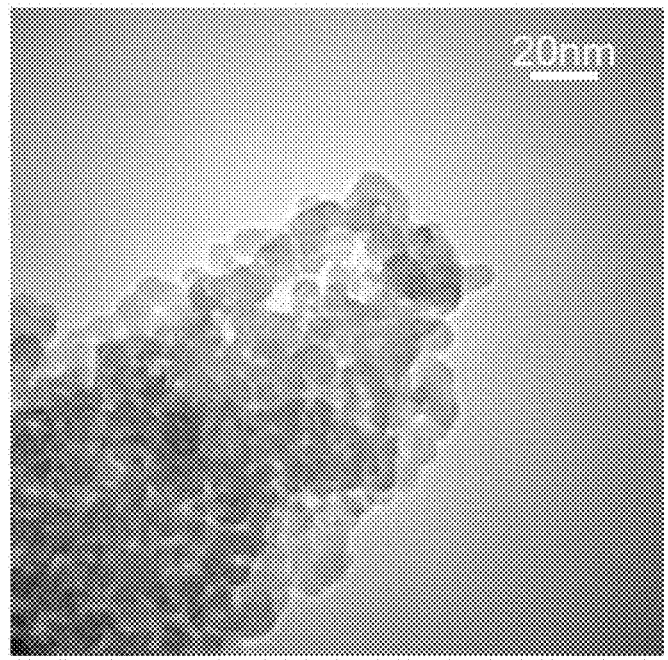

The size of particles can range from a few nanometers to hundreds of nanometers or even larger. For example we can prepare templates with the following particles: 5 nm, 7 nm, 12 nm, 22 nm, 44 nm, 60 nm, 80 nm, and 100 nm. The TEM images in FIGS. 7A-7C demonstrate the templates formed by 22 nm, 12 nm and 7 nm particles respectively. Apparently, larger particles can maintain their spherical shapes better while smaller ones tend to merge together and achieve a larger degree of agglomeration.

The stabilizers that inhibit the suspended particles from agglomeration can also be varied. The examples mentioned previously are stabilized by sodium counter ions, which are unfavorable in some biological systems due to sodium ions. To overcome this problem, suspensions stabilized by ammonium or other counter ions can also be used. The ammonium systems are much more bio-friendly and pH stable throughout the template production process.

Figure 8A:
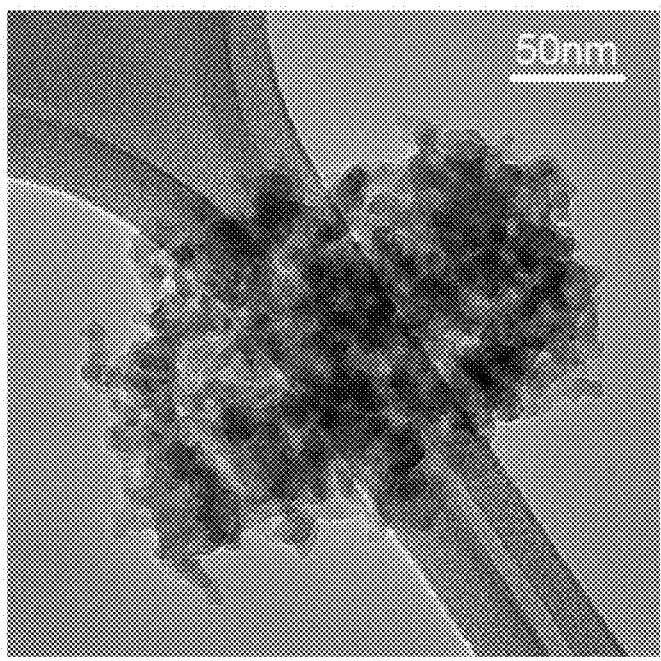
FIGS. 8A-8C show the TEM images of the templates made from colloidal suspensions with different initial pH values: 10 (FIG. 8A), 8 (FIG. 8B) and 4 (FIG. 8C).
Figure 8B:
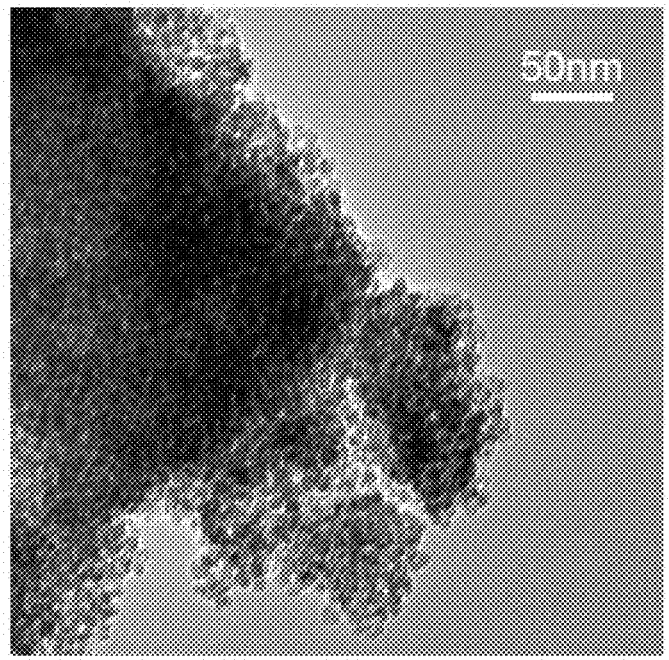
Figure 8C:
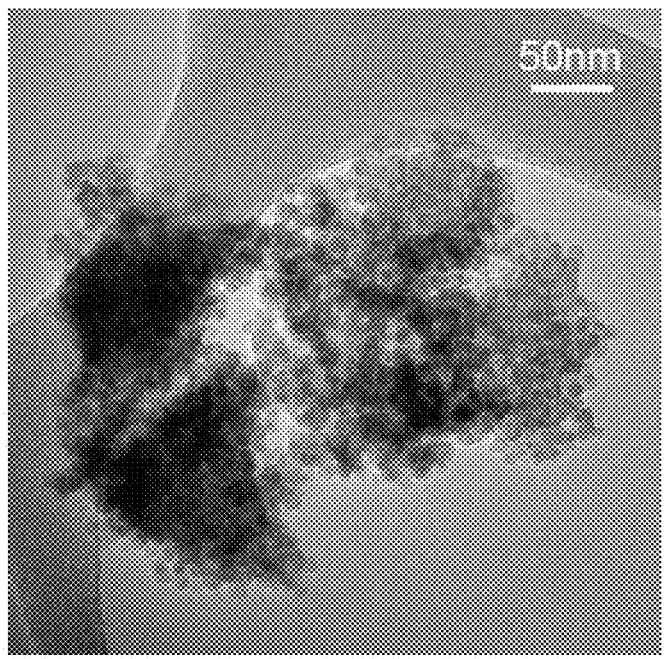

The pH value of the suspension can also be varied. TEM images in FIGS. 8A-8C illustrate templates made from suspensions with initial pH of 10, 8 and 4 respectively. The original sample has the pH value of 10. We add hydrochloric acid to adjust the initial pH value for different templates. FIGS. 8A-8C clearly shows that as pH decreases, the particles in the template become more spherical and intact, while a higher pH value tends to increase the degree of merge and agglomeration.

Figure 9A:
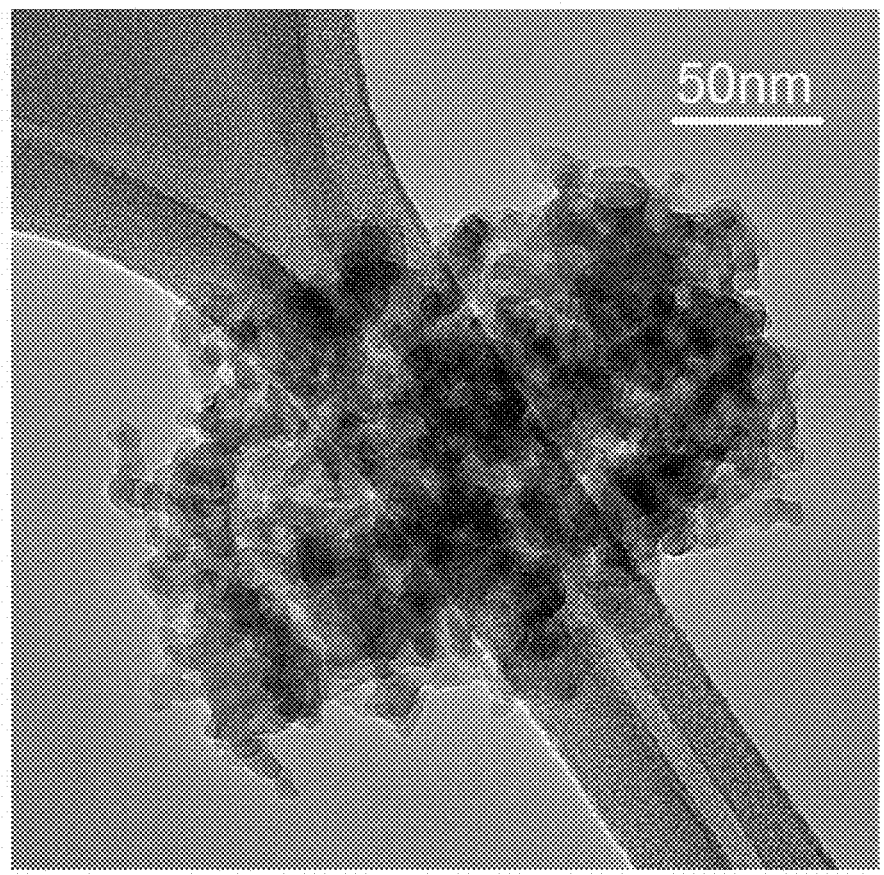
FIGS. 9A-9B show the TEM images of the templates made by the fast evaporation under vacuum (FIG. 9A) and slow evaporation in open-air (FIG. 9B), respectively.
Figure 9B:
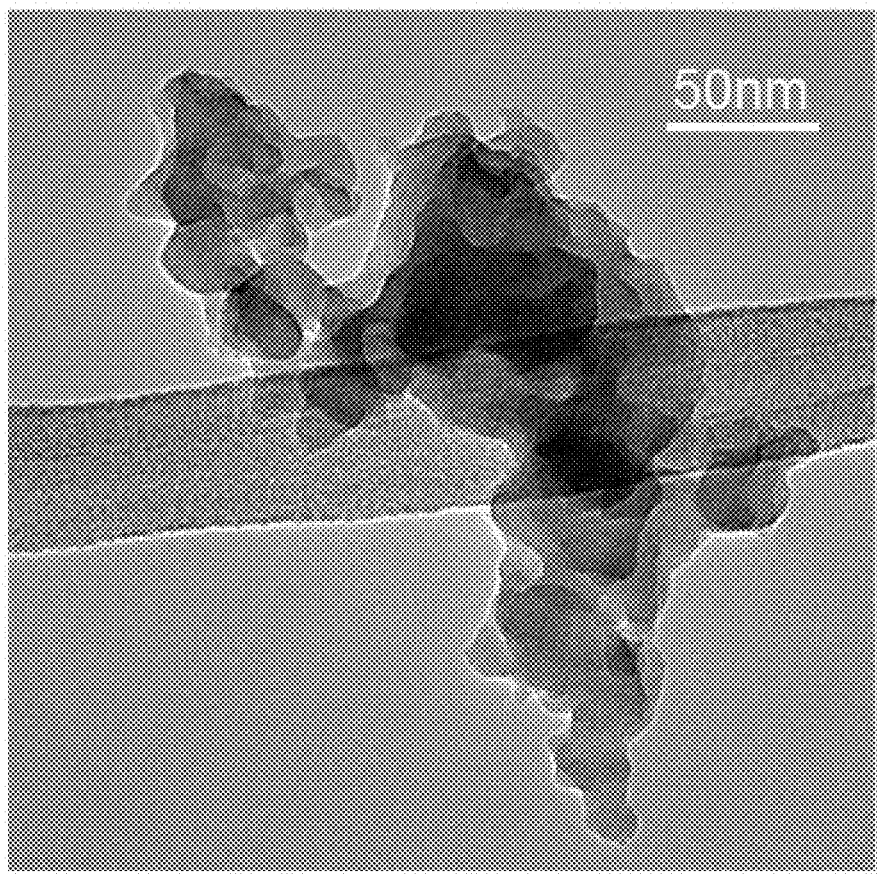

Speed of evaporation also plays an important role for template production. The suspension can evaporate either rapidly inside a vacuum chamber, or slowly in open air. FIGS. 9A-9B shows TEM images of templates by these two methods: clearly fast drying under vacuum produces a template with more intact particles, while slow drying in open-air causes more agglomeration.

Figure 10A:
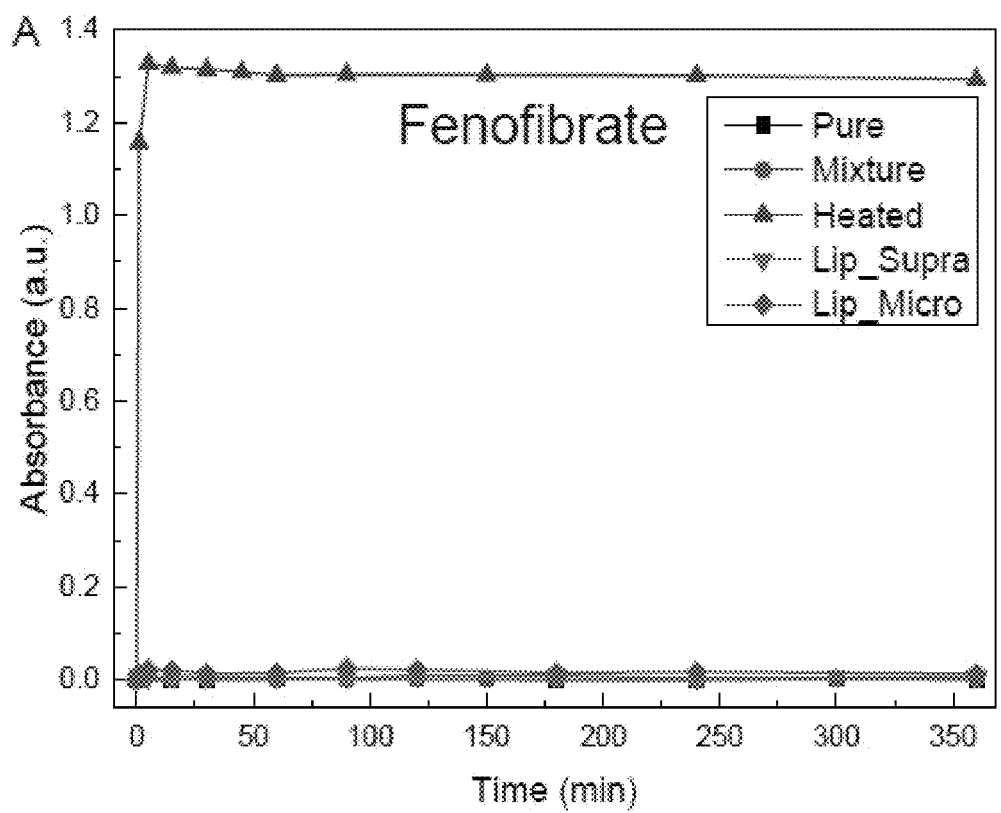
FIGS. 10A-10G show the general applicability of the subject method to various drugs dissolved in water (FIG. 10A)-(FIG. 10F), and in organic solvent beyond water (FIG. 10G).
Figure 10B:
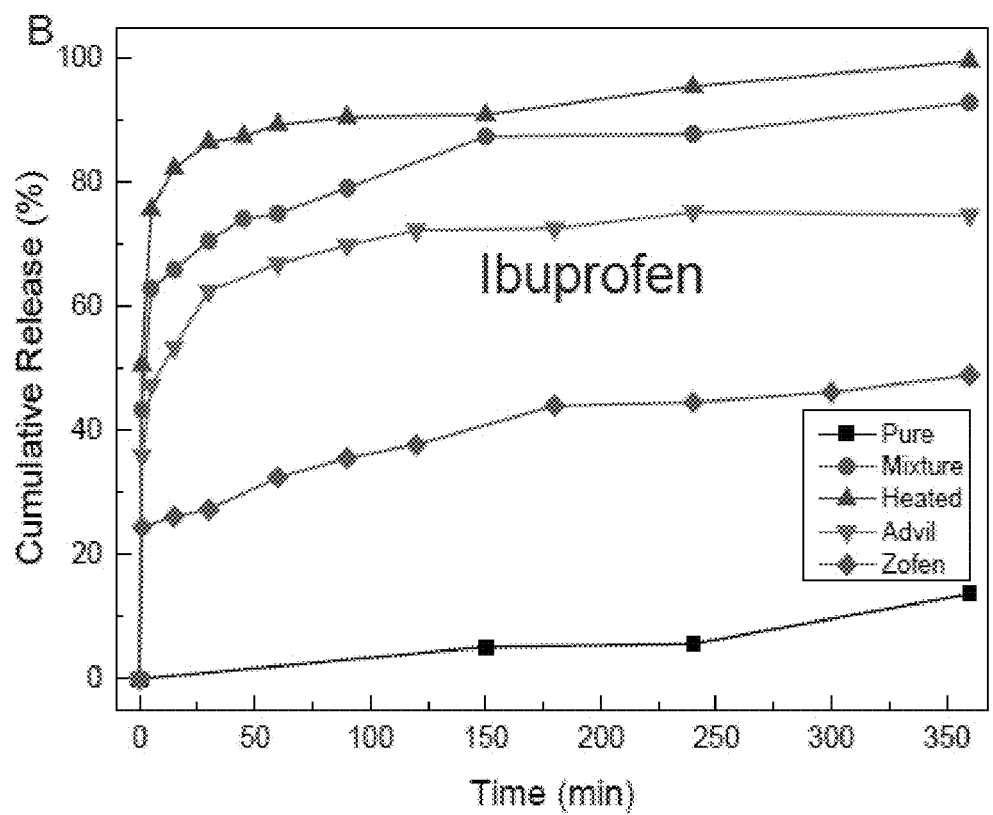

Example 7—In-Vitro Dissolution Studies for Various Drugs and Solvents (1) Dissolution Tests of Fenofibrate and Ibuprofen In-vitro dissolution tests are indispensable to demonstrate the oral bioavailability of poorly soluble drugs. The time dependent dissolution profiles of Fenofibrate and Ibuprofen, whose stable concentrations are shown in FIG. 5 and FIG. 6, are illustrated in FIGS. 10A-10B. The total drug dose is about 50 mg dissolved in 1 L of deionized water at the room temperature. In order to obtain the concentration versus time plot, a series of samples (3 mL) are withdrawn at predetermined time points, and the same amount of fresh media is added back to maintain a constant volume (1 L). These withdrawn samples are filtered by 0.22 μm MCE filters, and their concentrations are then determined with a UV spectrophotometer.

The drug release profiles of Fenofibrate and Ibuprofen are shown in FIGS. 10A and 10B For Fenofibrate, the UV absorbance for pure crystalline, physical mixture (i.e., without pressing and heating) and two commercial products (LIPANTHYL Supra and LIPANTHYL Micro) are extremely small, which are beyond the concentration versus absorbance calibration curve, and thus we can only report their absorbance data rather than the release percentage curve. Apparently, our composite can reach a concentration over 100-fold than all the other samples (including commercial drugs), and it rapidly releases all of the active ingredient within 1 minute. This comparison provides a well-founded proof that our approach provides an effective technique for insoluble drug candidates to break the solubility limit. For Ibuprofen in FIG. 10B, the composite again outperforms all other samples, with the fastest dissolution rate and highest ultimate released percentage, which dissolves 50% in 1 minute and up to 99% at the end of 6 hours.

(2) Universal Application to Other Poorly Dissolved Drugs in Water

To confirm the general applicability of this invention, we have applied our technique to other 4 insoluble drugs. We find that our approach can improve all these drugs' solubility and dissolution rate. However, the mixing, pressing and heating processes may influence dissolution performance to varying degrees, and one can adopt approaches appropriate for specific drugs. FIG. 10C, FIG. 10D, FIG. 10E, and FIG. 10F show the release profiles of four drugs dissolved in water: Flurbiprofen, Trimebutine, Ramipril and Ketoprofen, respectively.

Figure 10C:
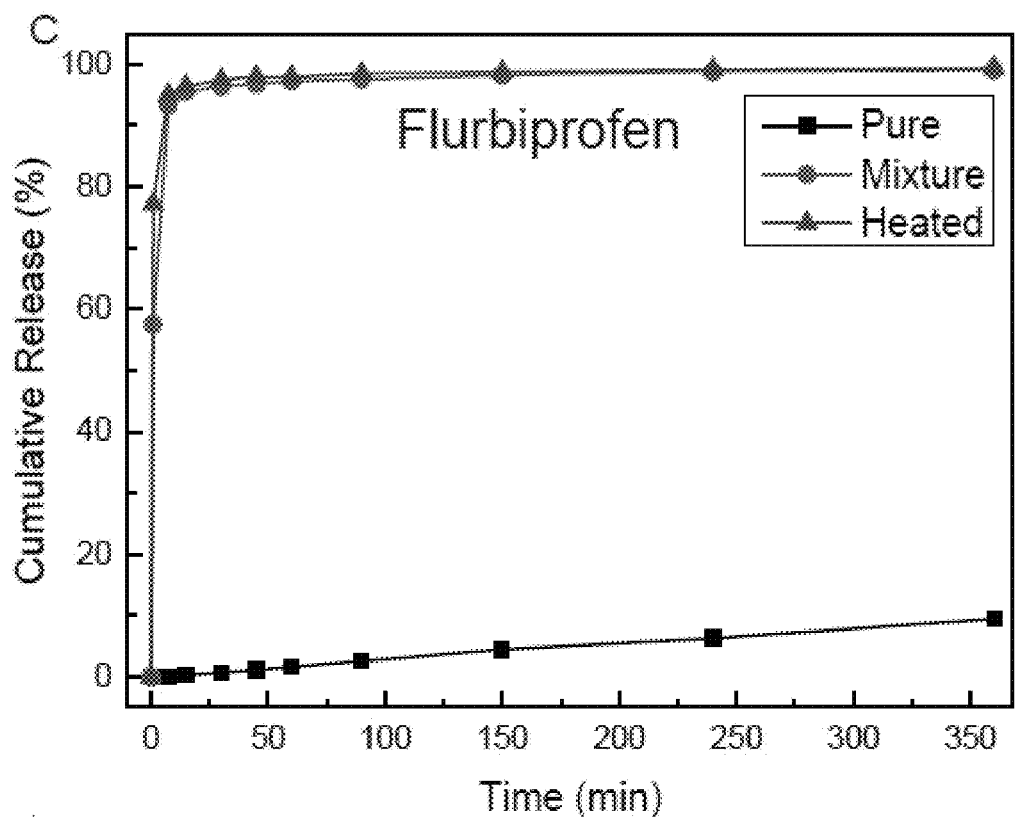

For Flurbiprofen, only mixing drug powder with silica template powder is sufficient to break the solubility limit. As shown in FIG. 10C, pure Flurbiprofen crystal exhibits relatively low release amount, i.e. 9.5% in 6 hours due to poor solubility. However, simply mixing the Flurbiprofen crystal and silica template powders can achieve a complete drug release in only 1 minute, and an approximately 10-fold higher concentration after 6 hours. With DSC measurements, we confirm that the drug in the mixture sample has an amorphous state. The heated composite also exhibits a similar improvement in solubility as the simple mixture without heating sample, as shown by the blue curve in FIG. 10C. Therefore, the simple mixing process is sufficient to change the Flurbiprofen crystal into the nano-amorphous state, which provides a rather simple and cheap manufacturing method to improve this drug's performance.

Figure 10D:
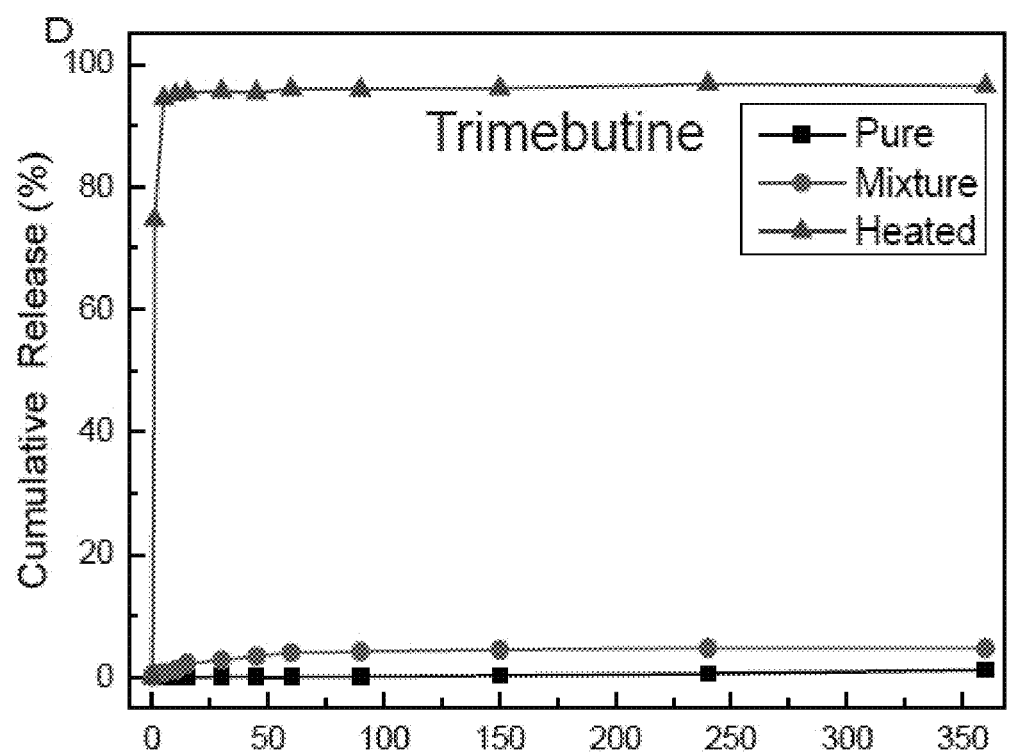

In another example of Trimebutine, however, pressing and heating become essential steps. As shown in FIG. 10D, pure Trimebutine crystal is insoluble in water, and only releases 1.18% during the overall 6 hours. Mixing Trimebutine crystal with template powders improves the solubility by a factor of four, with about 4.72% released after 6 hours, which is still quite low. DSC measurements show that the mixture sample still contains a certain amount of crystalline drug (see FIG. 11B). However, after pressing the mixed powders into tablets and then heating, the heated composite releases more than 70% of drug in less than 1 minute and approximately 95% within only 5 minutes. DSC measurements show that the drug has completely changed into amorphous state (see FIG. 11B) after heating. Therefore, pressing and heating become an important procedure when the mixing step itself has only slight improvement for solubility enhancement.

Figure 10E:
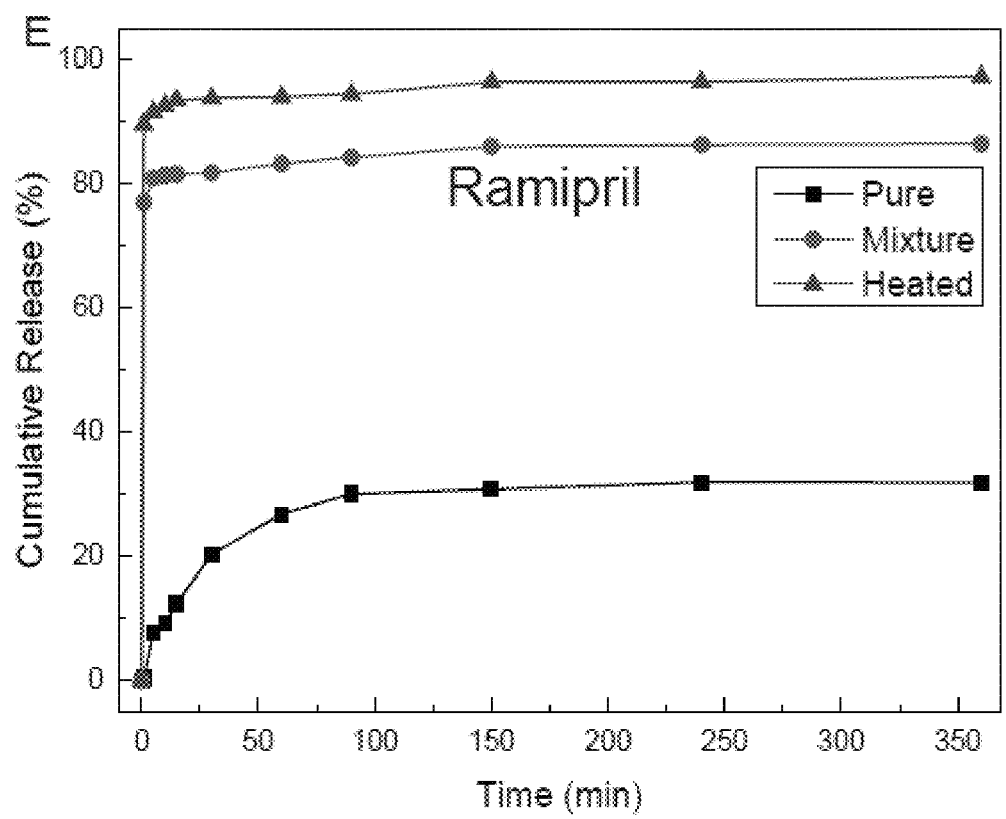
Figure 10F:
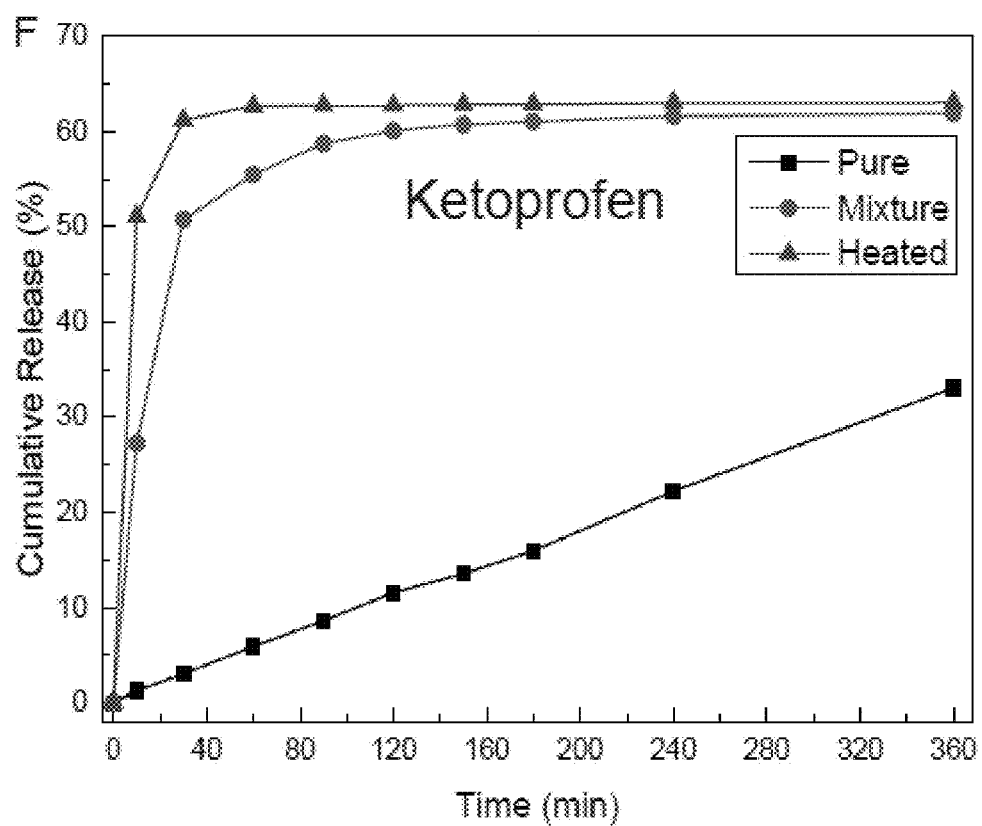

More poorly-soluble drugs can be improved by our method, such as Ramipril and Ketoprofen shown in FIGS. 10E-10F. In these two cases, simple mixture can improve the dissolution significantly, with more than 75% and 50% of drugs respectively released in 1 minute. In addition, pressing and heating can further enhance the performance, with nearly 90% and 60% released in 1 minute. This indicates that depending on different drugs, the steps of mixing, pressing, and heating may make independent contributions to realize the nano-amorphous drug state. To achieve the best outcome, we should choose appropriate steps or their combinations for different drugs, by balancing the improvement of solubility and the extra cost of each step.

(3) Generalizing Our Method to Organic Solvents

In addition to oral medicines dissolved in water, external medications such as ointments also occupy a considerable section of commercial drug markets. However, some pharmaceutical products cannot release quite well in organic solvents, which severely limit their bioavailability. Therefore, solubility enhancement in organic solvents for these sorts of products also has a great market potential. Fortunately, in vitro dissolution experiment proves that our methodology is also applicable to improve solubility in organic solvents.

Figure 10G:
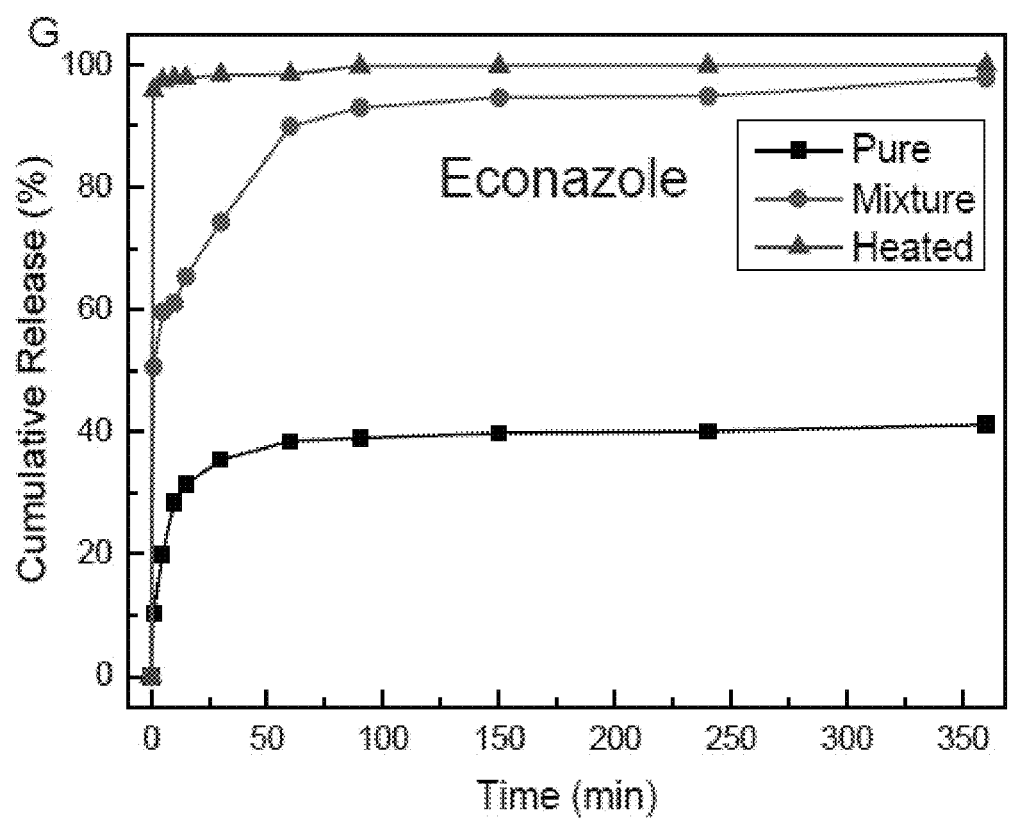

Econazole nitrate (ECZ), an antifungal drug primarily used to treat a variety of fungal skin infections, is selected as our model drug due to its relatively low solubility in organic solvents. The organic solvent, 2-Propanol, has been chosen as our dissolution medium. By simply mixing this drug with silica template to form a physical mixture, its ultimate concentration in 2-Propanol already increases by more than 2 times than the pure crystalline counterpart, as shown in FIG. 10G. After pressing and heating, the composite achieves an even better dissolution behavior, with more than 95% of drug released in less than 1 minute. In this case, the physical mixture achieves some improvement; and the additional steps of pressing and heating achieve even further improvement.

Example 8—Differential Scanning Calorimetry (DSC) for Thermal Analysis of Different Samples To explore the mechanism of solubility enhancement, we use Differential Scanning Calorimetry (DSC) to investigate the mass ratio of crystalline component (i.e., the degree of amorphization) for pure drug crystals, physical mixture and heated samples in FIGS. 11A-G. The presence of an endothermic peak owing to the melting of crystals represents the existence of a crystalline component of the drug. We can calculate this peak area to quantify the mass ratio of the crystalline component within the entire drug mass loaded in the sample.

Specific amounts of samples were accurately weighed and then put into an aluminum container. We selected the scanning temperature range to include the drug melting point at a heating rate of 10° C./min under continuous nitrogen flow. An identical but empty container was used as a reference. The following behaviors were observed:

(1) Combination of Mixing, Pressing and Heating to Achieve a Good Dissolution

Figure 11A:
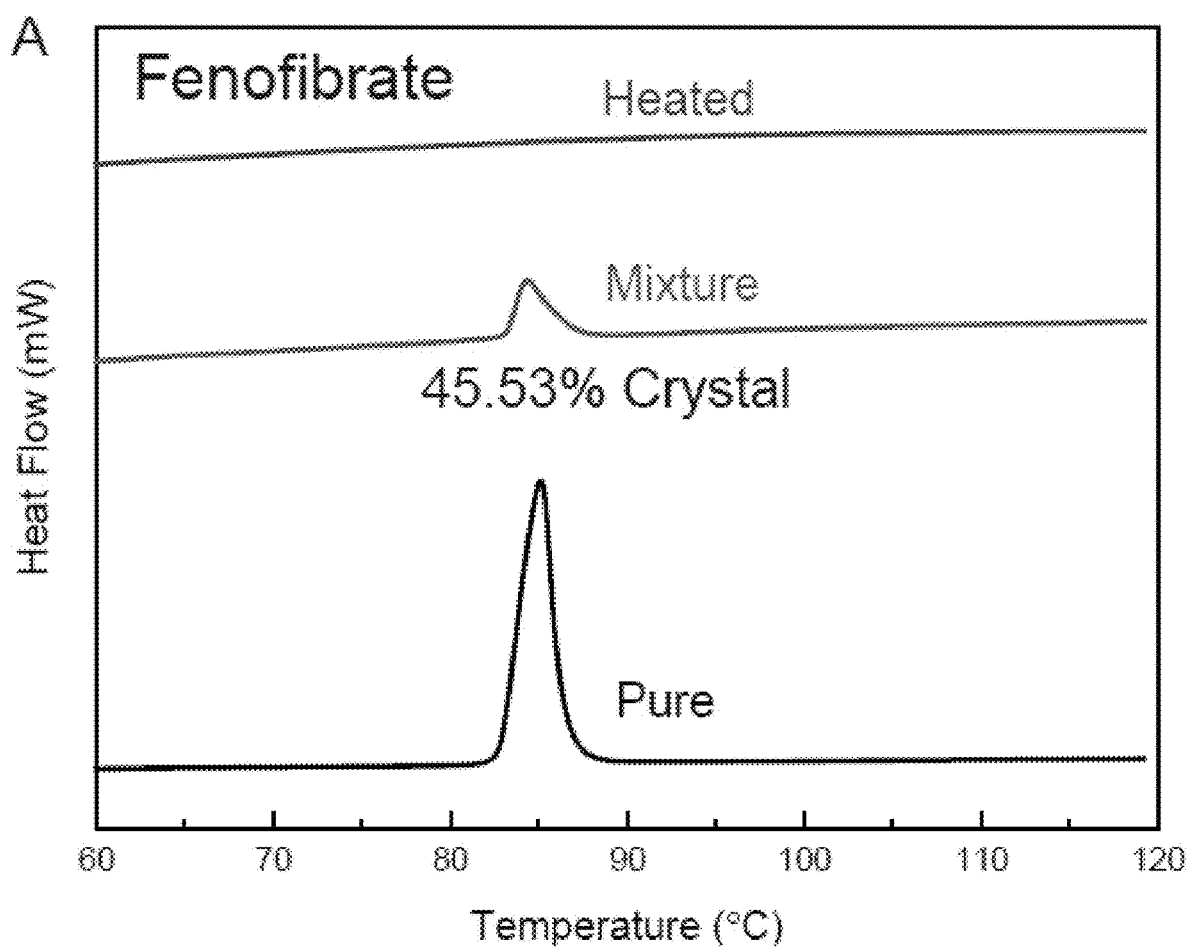
FIGS. 11A-11G show the Differential Scanning Calorimetry (DSC) results of various samples, which reveal the mass ratio of the crystalline component.

For Fenofibrate in FIG. 11A, the pure drug exhibits a strong and sharp endothermic peak with the onset temperature of 80.8° C., corresponding to its melting point. A melting peak still exists in the physical mixture sample; although, its intensity is decreased with 45.53% of the crystal remaining, which results in a partial amorphization of the drug. However, the pressed and then heated sample in FIG. 11A does not show any endothermic peak, which indicates a complete amorphization. Such heated samples also exhibit better solubility and a faster dissolution rate, as shown in FIG. 10A. Therefore, mixing can only achieve partial amorphization for Fenofibrate; and, a further pressing and heating step is necessary for complete amorphization.

Figure 11B:
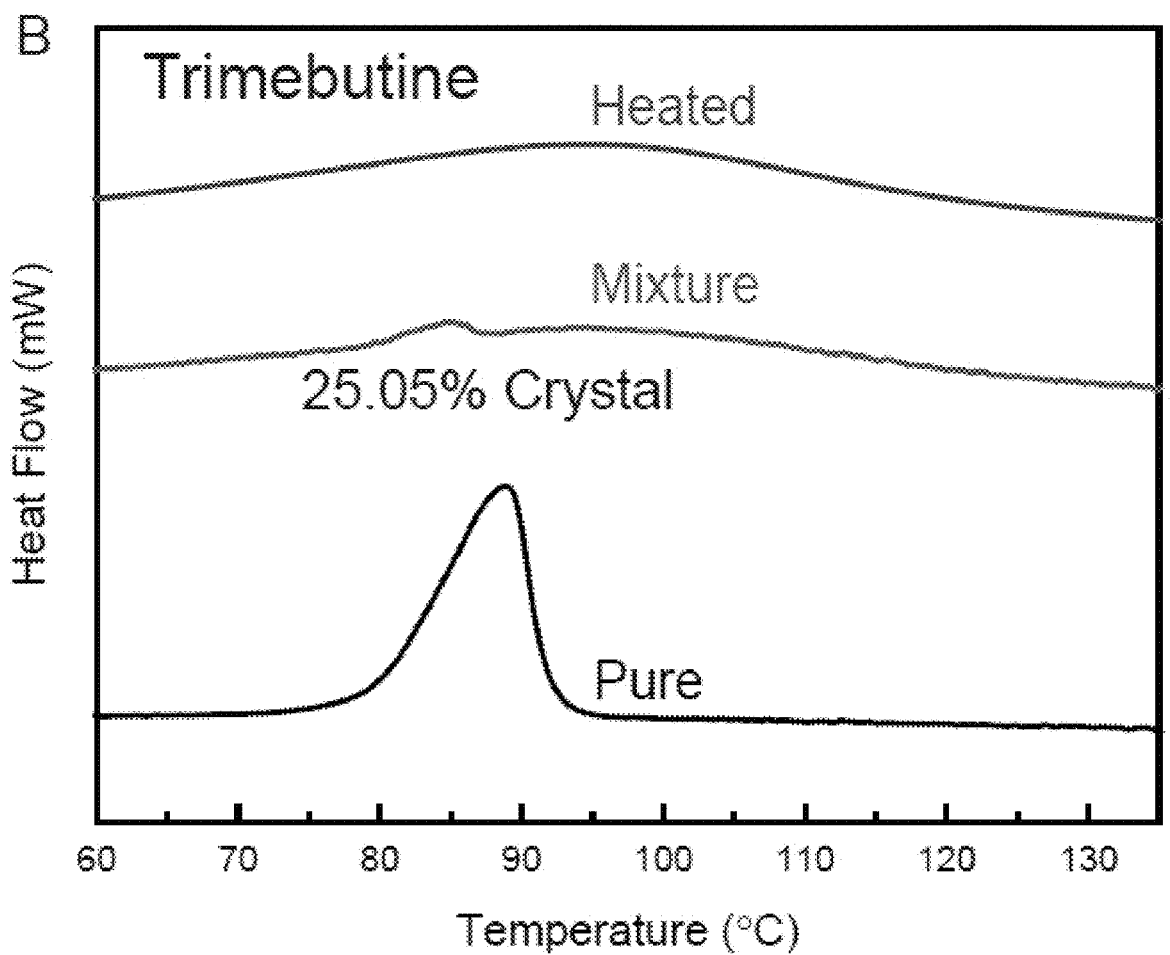

Similar characteristics can also be observed in other samples: the drug Trimebutine in FIG. 11B shows 25.05% of crystalline residual after physical mixing; and, the crystalline component disappears completely after additional pressing and heating processes. Accordingly, the solubility increases only slightly after the mixing process and a significant increase appears in the heated sample, as shown in FIG. 10D. We thus find that for some drugs, such as Fenofibrate and Trimebutine, simply mixing still leaves a significant fraction of crystalline component; and, thus, additional pressing and heating are required to achieve the ideal performance.

Figure 11C:
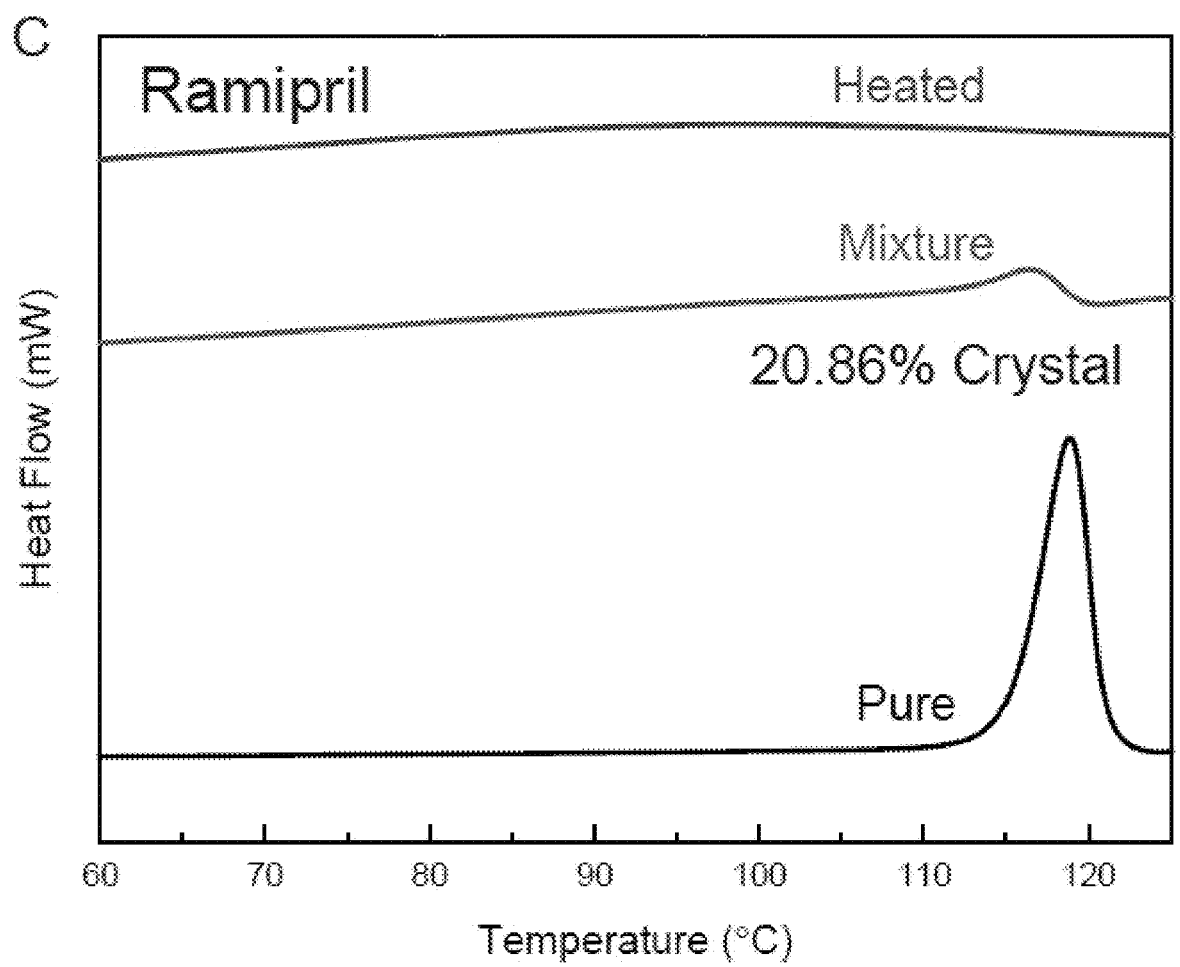
Figure 11D:
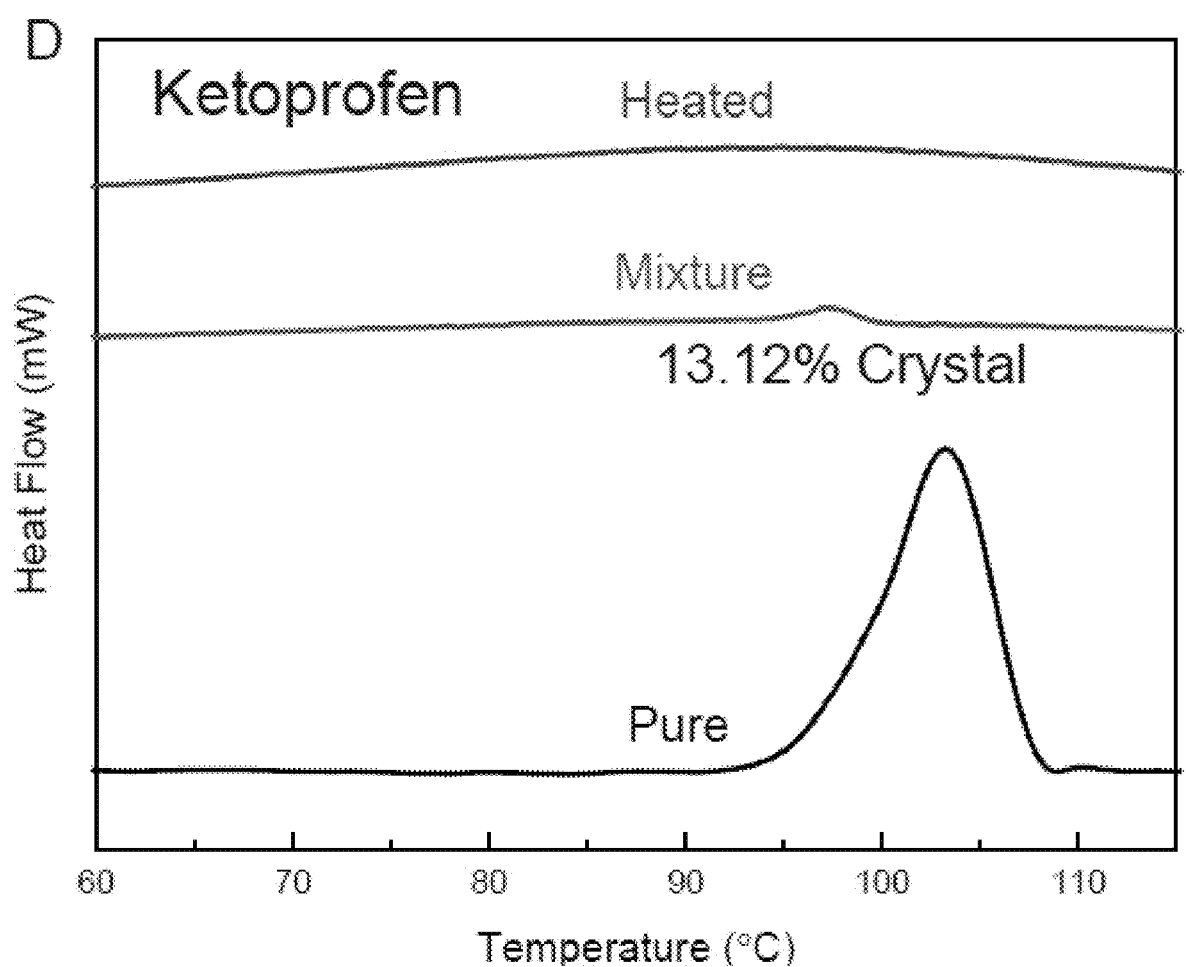

For some drugs like Ramipril and Ketoprofen, as shown in FIGS. 11C-11D, mixing causes a significant reduction in their crystallinity, with only 2.86% and 13.12% crystalline residual left. Since most drugs have converted to amorphous states, their solubility is significantly improved, as shown in FIGS. 10E-10F. With the help of further pressing and heating, no endothermic peak is observed in their DSC measurements (FIGS. 11C-11D), demonstrating a complete conversion to amorphous state. Accordingly, their dissolution curves also exhibit a further increase with a larger final concentration and a faster dissolution rate (FIGS. 10E-10F).

Figure 11E:
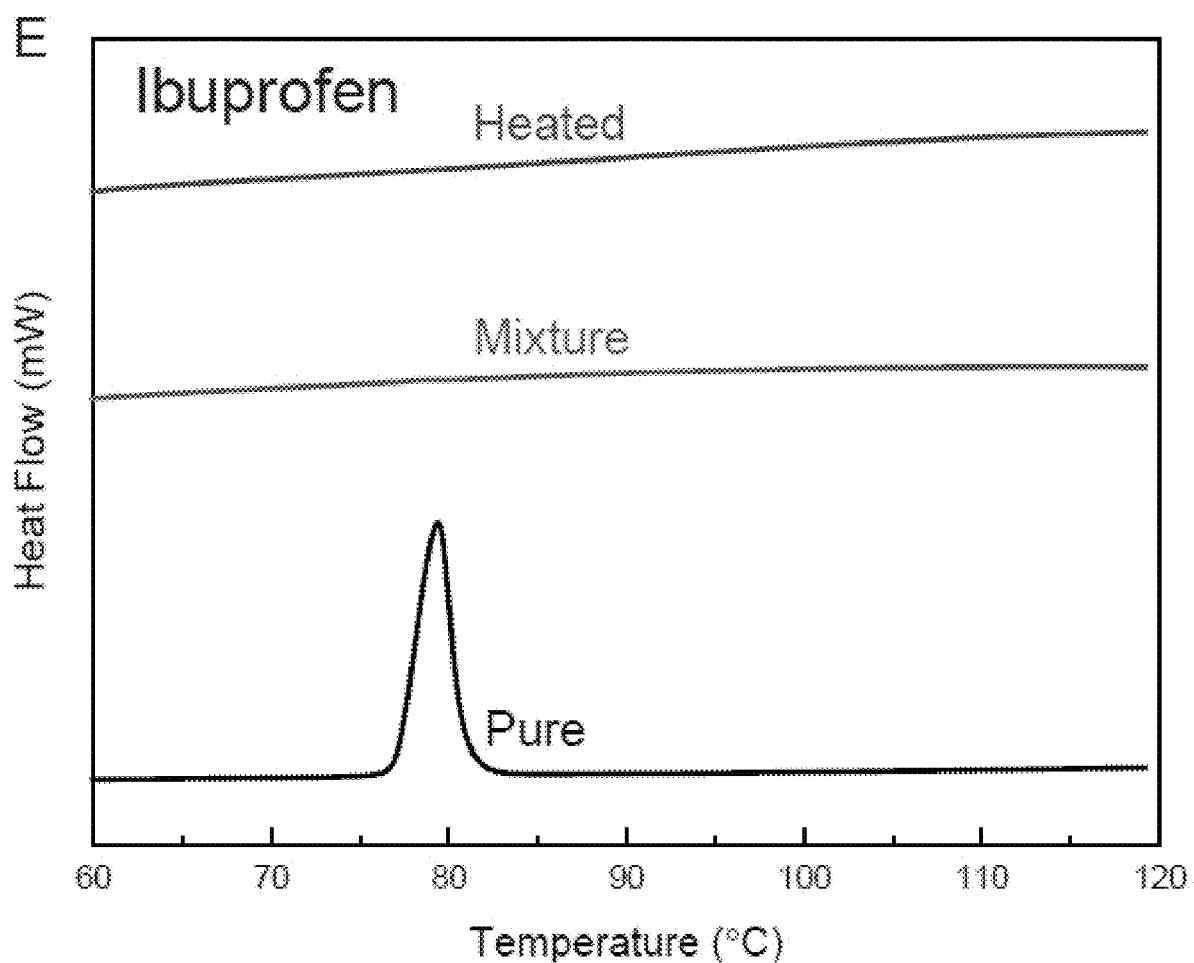
Figure 11F:
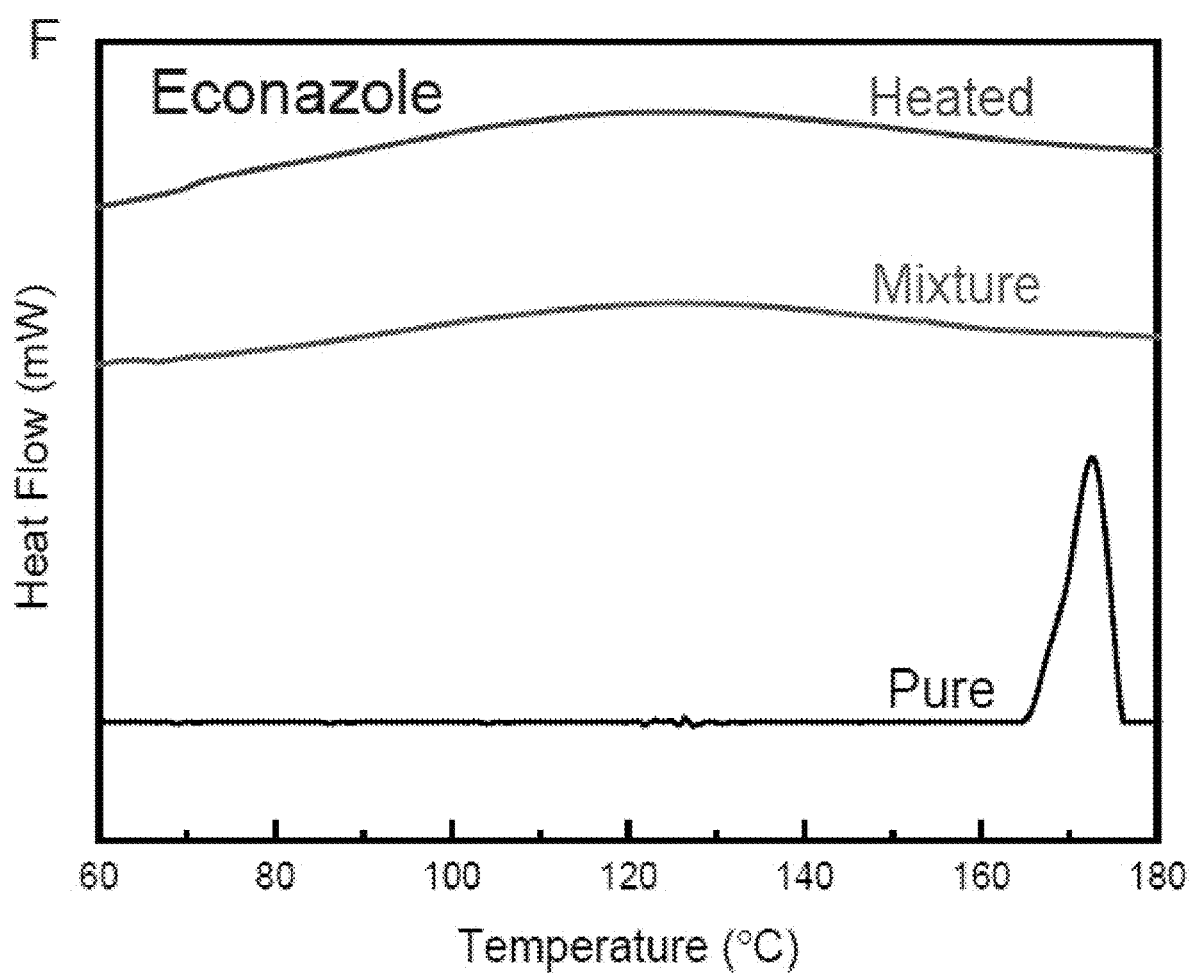
Figure 11G:
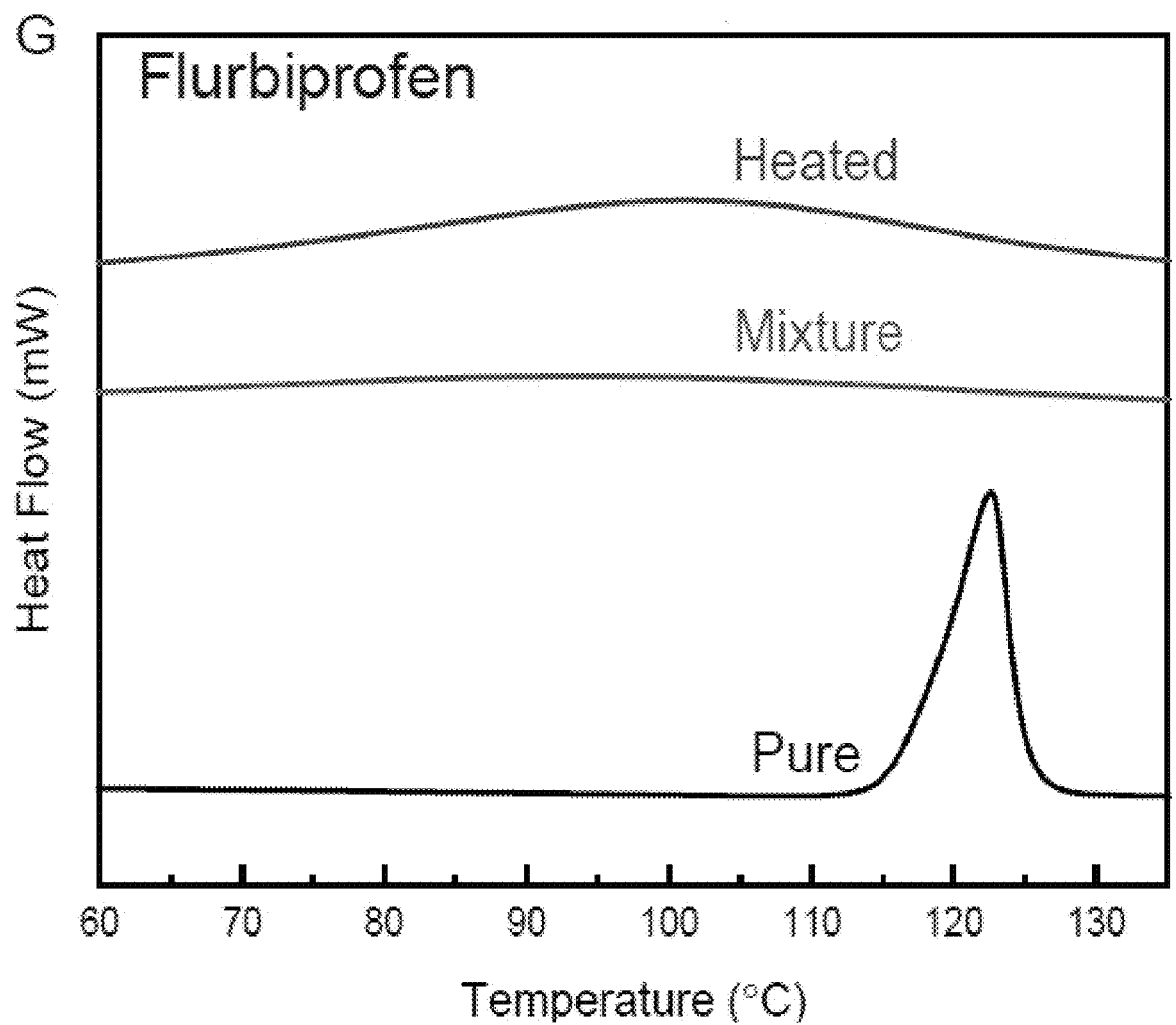

For Ibuprofen and Econazole, in FIGS. 11E and 11F, mixing itself is sufficient to achieve complete amorphization, as demonstrated by the absence of an endothermic peak for the simple mixture samples. However, pressing and heating still serve as an indispensable step for a better dissolution performance, as shown in FIG. 10B and FIG. 10 G. We believe that pressing and heating help to reduce the drug particle size further, to achieve a better nano-amorphous state and thus better dissolving characteristics.

(2) Mixing Itself can Achieve a Good Dissolution

By contrast, for some drugs, simply mixing the drug with the template can convert the drug crystals into nano-amorphous state completely, which leads to a significantly enhanced solubility and dissolution rate. As an example, for the drug Flurbiprofen in FIG. 11G, both the physical mixture and the heated sample do not exhibit any endothermic peak, indicating a complete amorphization. Accordingly, both the physical mixture and the heated samples exhibit excellent dissolution characteristics with complete drug release within 1 minute, as illustrated in FIG. 10C.

In this example, we applied the DSC thermal analysis to investigate the amorphization for pure crystalline drugs, physical mixture and heated samples reported in FIGS. 10A-10G. In some cases, the mixing process itself can only eliminate some crystalline fractions and we still need pressing and heating to convert the entire drug into nano-amorphous state. However, there are also examples in which mixing itself is enough to realize a nano-amorphous state. To achieve the ideal result with a minimal number of steps, one should consider the specific properties of the both drug and the template.

CONCLUSION

To conclude, we have invented a novel strategy to tackle the problem of poor solubility of drugs to achieve a better bioavailability and therapy efficacy. Our method is applicable to both a wide range of drugs and different dissolving solvents, including both water and organic solvents. This ensures its universal applicability to both oral drugs and external medications. By a flexible manipulation of appropriate processing steps, drug ingredients can change from crystalline to nano-amorphous state, which significantly increases their solubility. The typical steps of making template, drying, mixing, pressing and heating are all common industrial operations, which are suitable for large scale manufacture with relatively low cost.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

1. Bertei, A., Nucci, B. & Nicolella, C. Effective Transport Properties in Random Packings of Spheres and Agglomerates. *Chem. Eng. Trans.* 32, 1531-1536 (2013).
2. Kresge, C. T., Leonowicz, M. E., Roth, W. J., Vartuli, J. C. & Beck, J. S. Ordered mesoporous molecular sieves synthesized by a liquid-crystal template mechanism. *Nature* 359, 710-712 (1992).
3. Hinds, B. J. et al. Aligned Multiwalled Carbon Nanotube Membranes. *Science* 303, 62-65 (2004).
4. E. Danks, A., R. Hall, S. & Schnepp, Z. The evolution of 'sol-gel' chemistry as a technique for materials synthesis. *Mater. Horiz.* 3, 91-112 (2016).
5. Rahman, I. A., Vejayakumaran, P., Sipaut, C. S., Ismail, J. & Chee, C. K. Effect of the drying techniques on the morphology of silica nanoparticles synthesized via sol-gel process. *Ceram. Int.* 34, 2059-2066 (2008).
6. Laurie, J. et al. Colloidal suspensions for the preparation of ceramics by a freeze casting route. *J. Non-Cryst. Solids* 147-148, 320-325 (1992).
7. Washburn, E. W. The Dynamics of Capillary Flow. *Phys. Rev.* 17, 273-283 (1921).

We claim:

1. A method for producing nano-amorphous composite materials, the method comprising:
    i) providing an active compound;
    ii) providing a porous template made by agglomerating silica nanoparticles in an aqueous colloidal suspension and drying to preserve the porous template in dry conditions;
    iii) melting, grinding, suspending, or dissolving the active compound in a solution to yield a ground active compound, a melted active compound, a suspended active compound, or a dissolved active compound;
    iv) loading the ground active compound, melted active compound, dissolved active compound, or suspended active compound into the porous template to form an active compound loaded template;
    v) pressing the active compound loaded porous template; and
    vi) heating the active compound loaded porous template to form a composite material of the active compound absorbed in pores of the agglomerated silica nanoparticles wherein all of the active compound is in an amorphous state.

2. The method of claim 1, wherein the silica nanoparticles in the aqueous colloidal suspension have a particle size of 1 nm to 100 nm.

3. The method of claim 1, wherein the active compound is a drug, wherein the drug is a water-insoluble drug.

4. The method of claim 3, wherein the drug is any of Ibuprofen, Ketoprofen, Flurbiprofen, Diclofenac, Oxaprozin, Indomethacin, Naproxen, Trimebutine, Fenofibrate, Econazole, and Ramipril.

5. The method of claim 1, wherein the aqueous colloidal suspension further comprises a stabilizer, wherein the stabilizer is ammonium, sodium ion, or a combination thereof.

6. The method of claim 1, wherein step iv) further comprises mixing the dry template and the active compound and grinding the mixed dry template and the active compound into a powder with a particle size of about 0.1 μm to about 1000 μm.

7. The method of claim 6, further comprising compressing the mixed dry template and the active compound powder together into tablets.

8. The method of claim 1, further comprising melting of the active compound at a temperature at or above a melting point of the active compound and maintaining the temperature during the loading of the melted active compound into the porous template.

9. The method of claim 1, wherein after the ground, melted, dissolved, or suspended active compound is loaded into the porous template, the method further comprises:
    vii) cooling the loaded ground, melted, dissolved, or suspended active compound in the porous template to below a melting point of the active compound to about 18° C. to about 28° C. or to about room temperature and/or removing the solvent after the active compound is loaded into the porous template.

* * * * *